(12) United States Patent
Neves et al.

(10) Patent No.: US 9,648,446 B2
(45) Date of Patent: May 9, 2017

(54) SYSTEMS AND METHODS FOR SHIPPING MANAGEMENT IN A NETWORK OF MOVING THINGS

(71) Applicant: Veniam, Inc., Mountain View, CA (US)

(72) Inventors: Filipe Neves, Aguada de Baixo (PT); Diogo Lopes, Esgueira (PT)

(73) Assignee: VENIAM, INC., Mountain View, CA (US)

( * ) Notice: Subject to any disclaimer, the term of this patent is extended or adjusted under 35 U.S.C. 154(b) by 0 days.

(21) Appl. No.: 15/245,992

(22) Filed: Aug. 24, 2016

(65) Prior Publication Data

US 2017/0086011 A1 Mar. 23, 2017

Related U.S. Application Data

(60) Provisional application No. 62/222,190, filed on Sep. 22, 2015.

(51) Int. Cl.
| | |
|---|---|
| *H04W 24/00* | (2009.01) |
| *H04W 4/00* | (2009.01) |
| *H04B 1/3822* | (2015.01) |
| *G06Q 10/08* | (2012.01) |
| *H04W 88/08* | (2009.01) |
| *H04W 84/00* | (2009.01) |
| *H04L 29/08* | (2006.01) |
| *G06Q 50/30* | (2012.01) |

(52) U.S. Cl.
CPC ........ *H04W 4/005* (2013.01); *G06Q 10/0833* (2013.01); *H04B 1/3822* (2013.01); *G06Q 50/30* (2013.01); *H04L 67/12* (2013.01); *H04W 84/005* (2013.01); *H04W 88/08* (2013.01)

(58) Field of Classification Search
CPC ... H04W 4/005; H04W 88/08; H04W 84/005; H04B 1/3822; G06Q 10/0833; G06Q 50/30; H04L 67/12
USPC ................................ 455/456.1, 456.6, 426.1
See application file for complete search history.

(56) References Cited

U.S. PATENT DOCUMENTS

| | | | | |
|---|---|---|---|---|
| 2003/0098802 | A1* | 5/2003 | Jones ..................... | G08G 1/123 340/994 |
| 2004/0082341 | A1* | 4/2004 | Stanforth ............. | G01C 21/206 455/456.1 |
| 2007/0152815 | A1* | 7/2007 | Meyers ................... | H04Q 9/00 340/539.22 |
| 2008/0061963 | A1* | 3/2008 | Schnitz ................. | G06Q 10/08 340/539.13 |
| 2009/0279490 | A1* | 11/2009 | Alcorn ............... | H04B 7/18506 370/329 |

(Continued)

OTHER PUBLICATIONS

PCT International Search Report for PCT/US2016/052924 dated Oct. 31, 2016.

*Primary Examiner* — Khai M Nguyen
(74) *Attorney, Agent, or Firm* — McAndrews, Held & Malloy, Ltd.

(57) ABSTRACT

Systems and methods for shipping management in a network of moving things. As non-limiting examples, various aspects of this disclosure provide systems and methods for integrating sensors, mobile access points, and/or the network of moving things with shipping container management systems (e.g., port management systems, train management systems, trucking management systems, etc.).

28 Claims, 14 Drawing Sheets

(56) References Cited

U.S. PATENT DOCUMENTS

| | | | | |
|---|---|---|---|---|
| 2011/0156924 A1* | 6/2011 | Nadeem | ............... | G08G 1/0133 340/905 |
| 2013/0285855 A1* | 10/2013 | Dupray | ................ | G01S 19/48 342/451 |
| 2013/0329598 A1* | 12/2013 | DiFazio | ............. | H04W 64/003 370/254 |
| 2015/0061895 A1* | 3/2015 | Ricci | ...................... | H04W 4/22 340/902 |
| 2016/0142880 A1* | 5/2016 | Talluri | ................ | H04W 4/025 455/456.1 |
| 2016/0195602 A1* | 7/2016 | Meadow | ................ | G01S 5/10 701/517 |
| 2016/0260059 A1* | 9/2016 | Benjamin | .......... | G06Q 10/0832 |
| 2017/0086230 A1* | 3/2017 | Azevedo | ............. | H04W 76/02 |

\* cited by examiner

SYSTEMS AND METHODS FOR SHIPPING MANAGEMENT IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Application Ser. No. 62/222,190, titled "Systems and Methods for Port Management in a Network of Moving Things," filed on Sep. 22, 2015. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," filed on Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current shipping management systems (e.g., shipping container management systems, port management systems, train management systems, trucking management systems, etc.) are inefficient, for example failing to utilize sensor information available to them. As a non-limiting example, current shipping container management systems do not take full advantage of sensor technology integrated with the Internet of moving things. Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
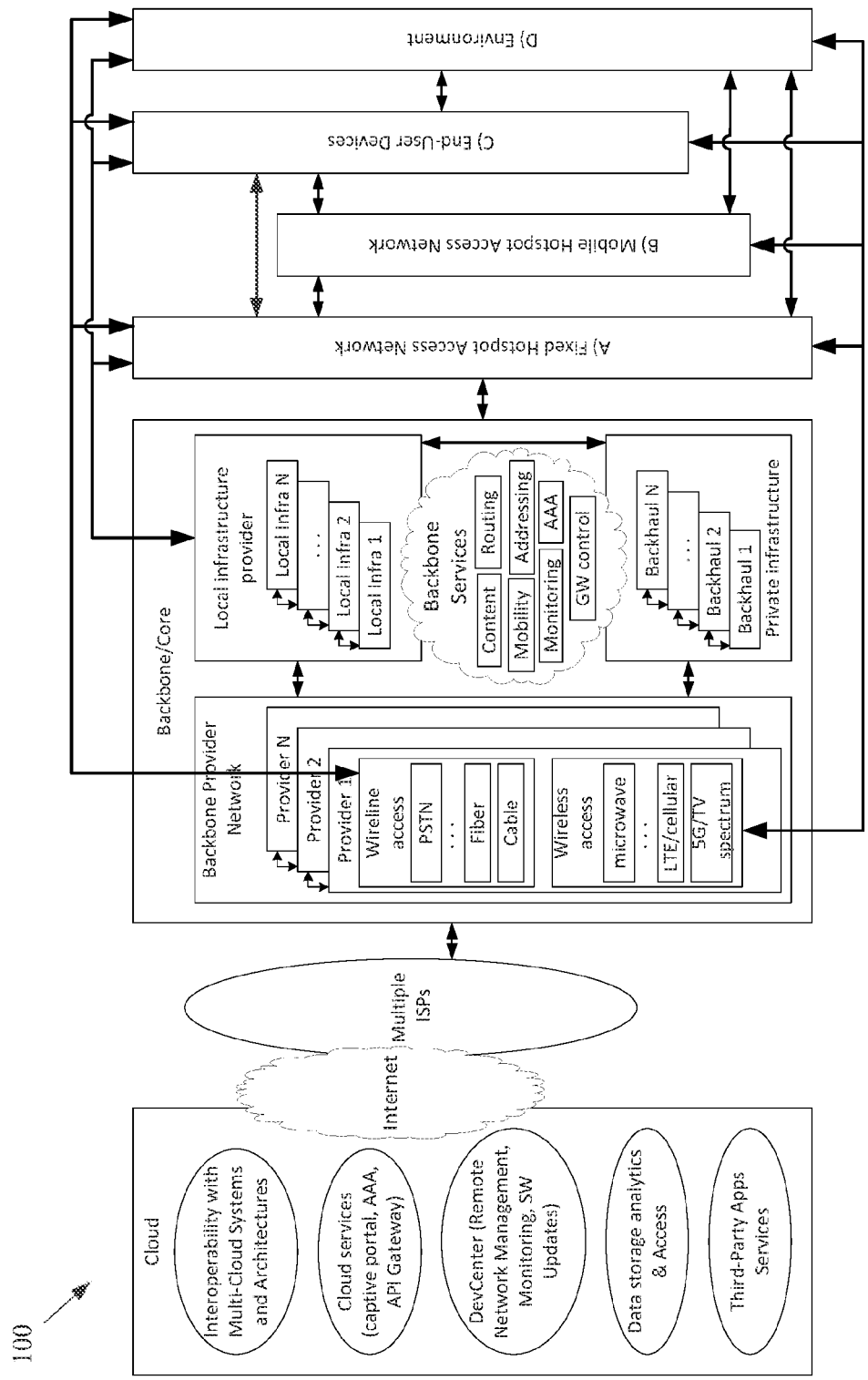
FIG. 1 shows a block diagram of a communication network, in accordance with various aspects of this disclosure.

Various aspects of this disclosure provide systems and methods for shipping management in a network of moving things. As non-limiting examples, various aspects of this disclosure provide systems and methods for integrating sensors, mobile access points, and/or the network of moving things with shipping container management systems (e.g., port management systems, train management systems, trucking management systems, etc.).

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, nodes, networks, and/or network components 200, 300, 400, 500-570, 600, 700, 800, 900, 1000, 1100, and 1200, shown and/or discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
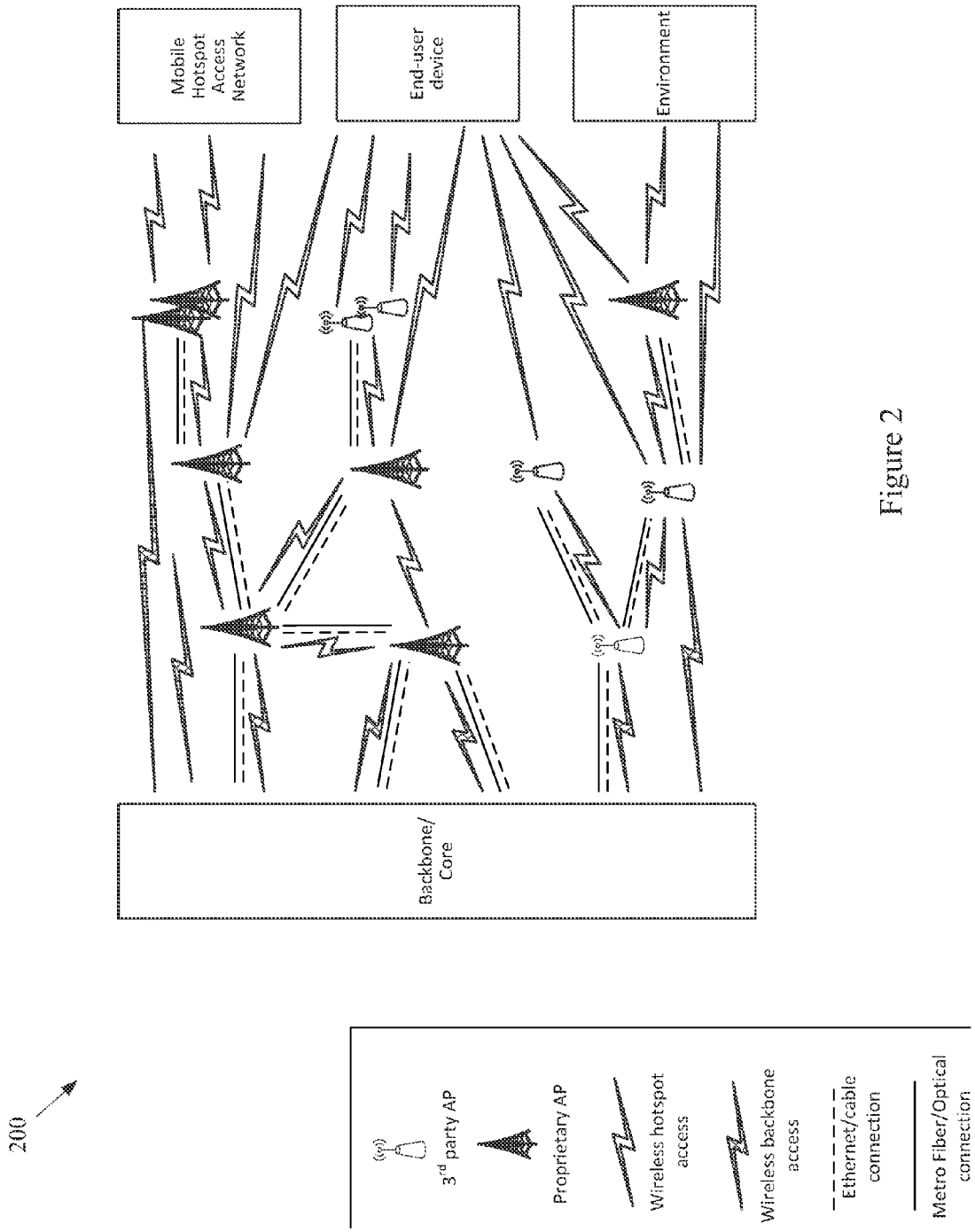
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, nodes, networks, and/or network components 100, 300, 400, 500-570, 600, 700, 800, 900, 1000, 1100, and 1200, shown and/or discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
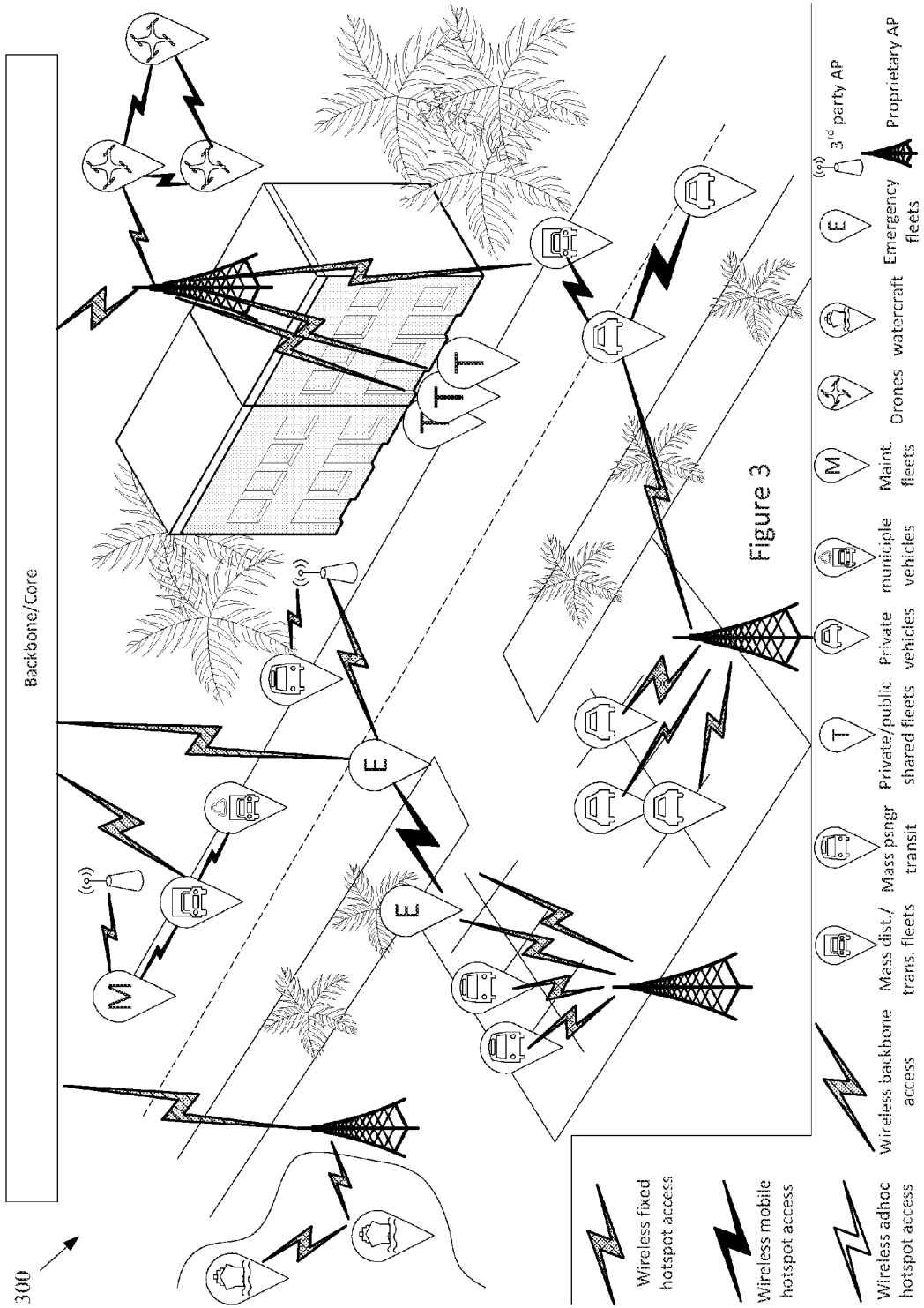
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, nodes, networks, and/or network components 100, 200, 400, 500-570, 600, 700, 800, 900, 1000, 1100, and 1200, shown and/or discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
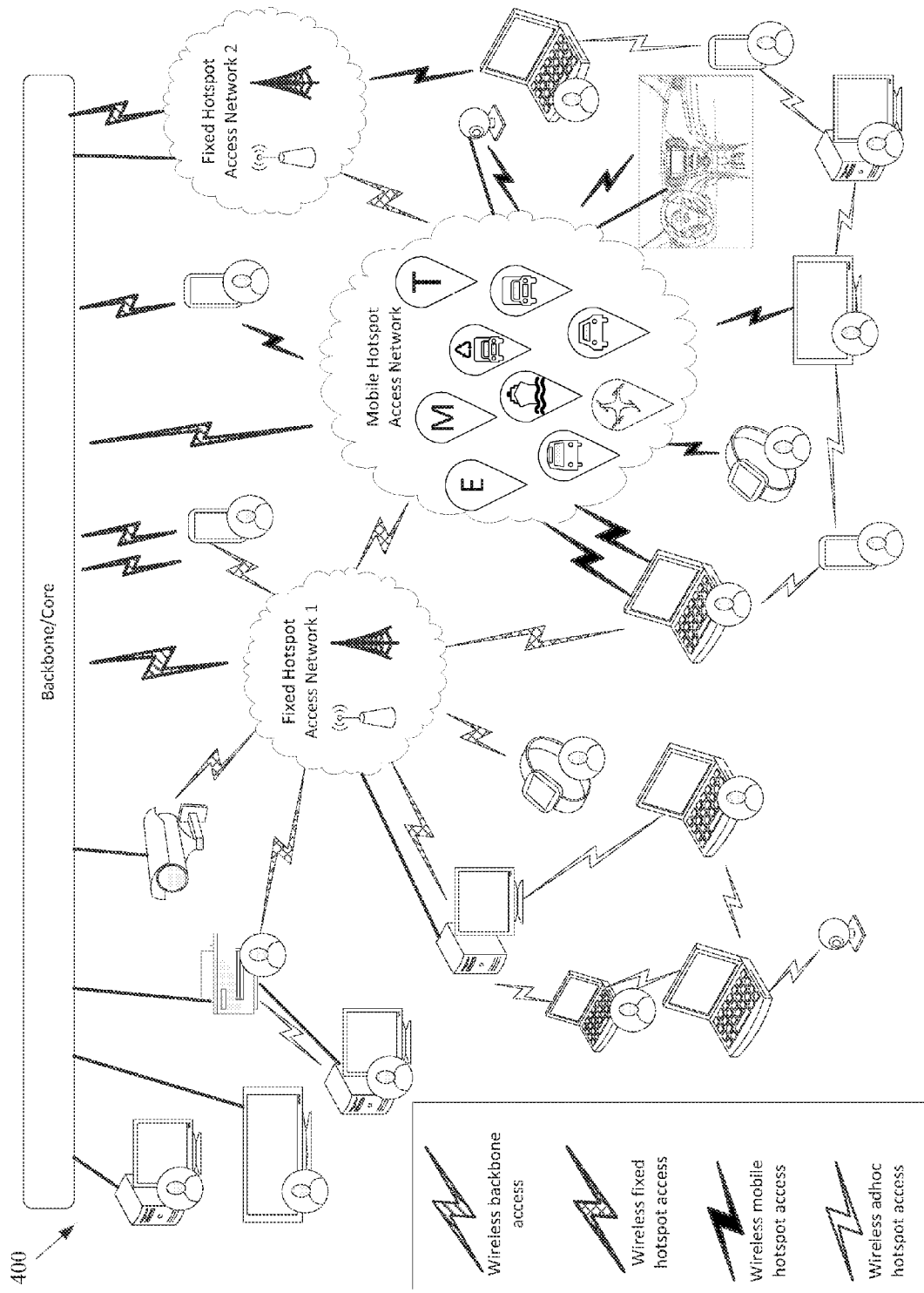
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, nodes, networks, and/or network components 100, 200, 300, 500-570, 600, 700, 800, 900, 1000, 1100, and 1200, shown and/or discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
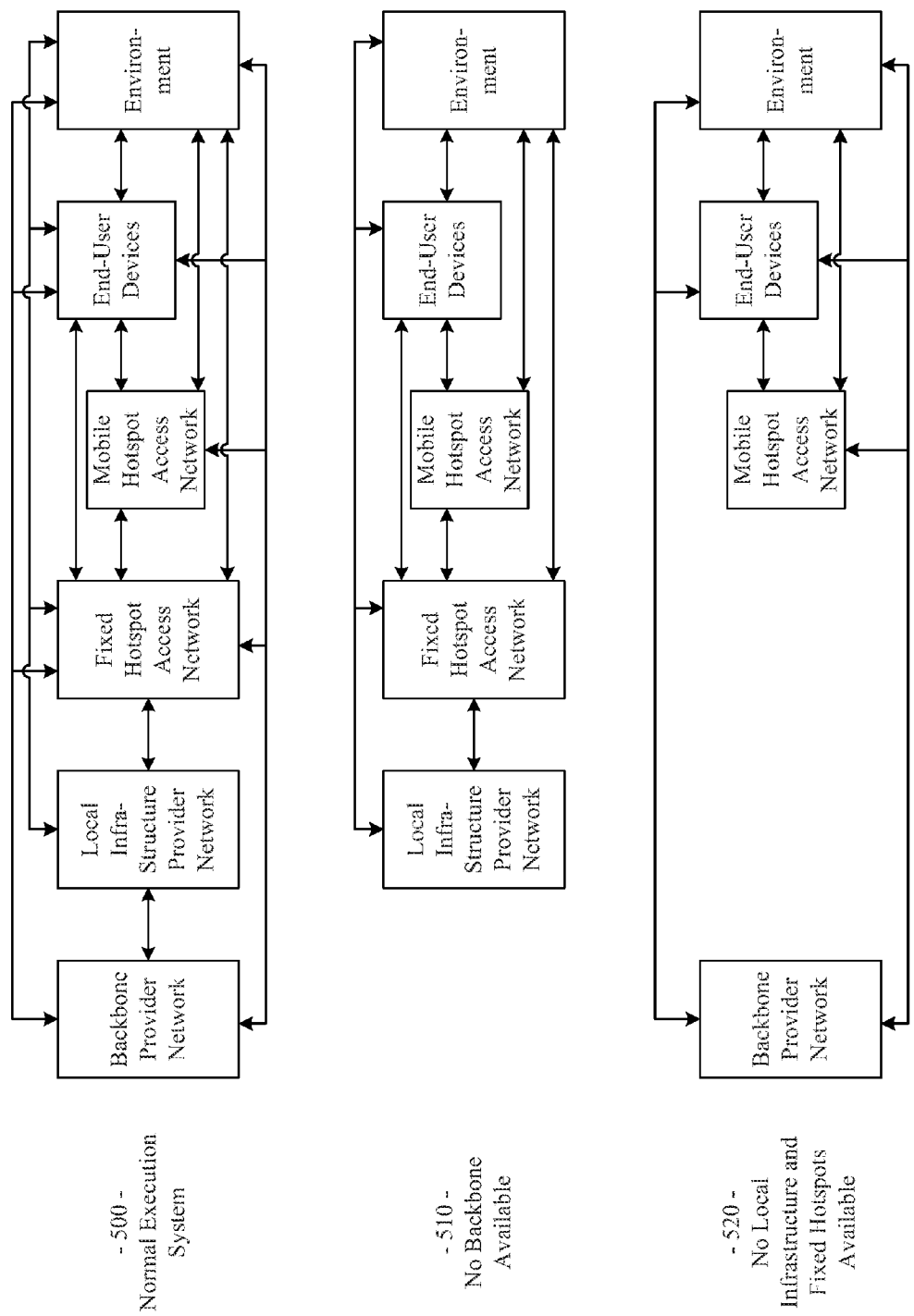
FIGS. 5A-5C show a plurality of network configurations illustrating the flexibility and/or and resiliency of a communication network, in accordance with various aspects of this disclosure.
Figure 5B:
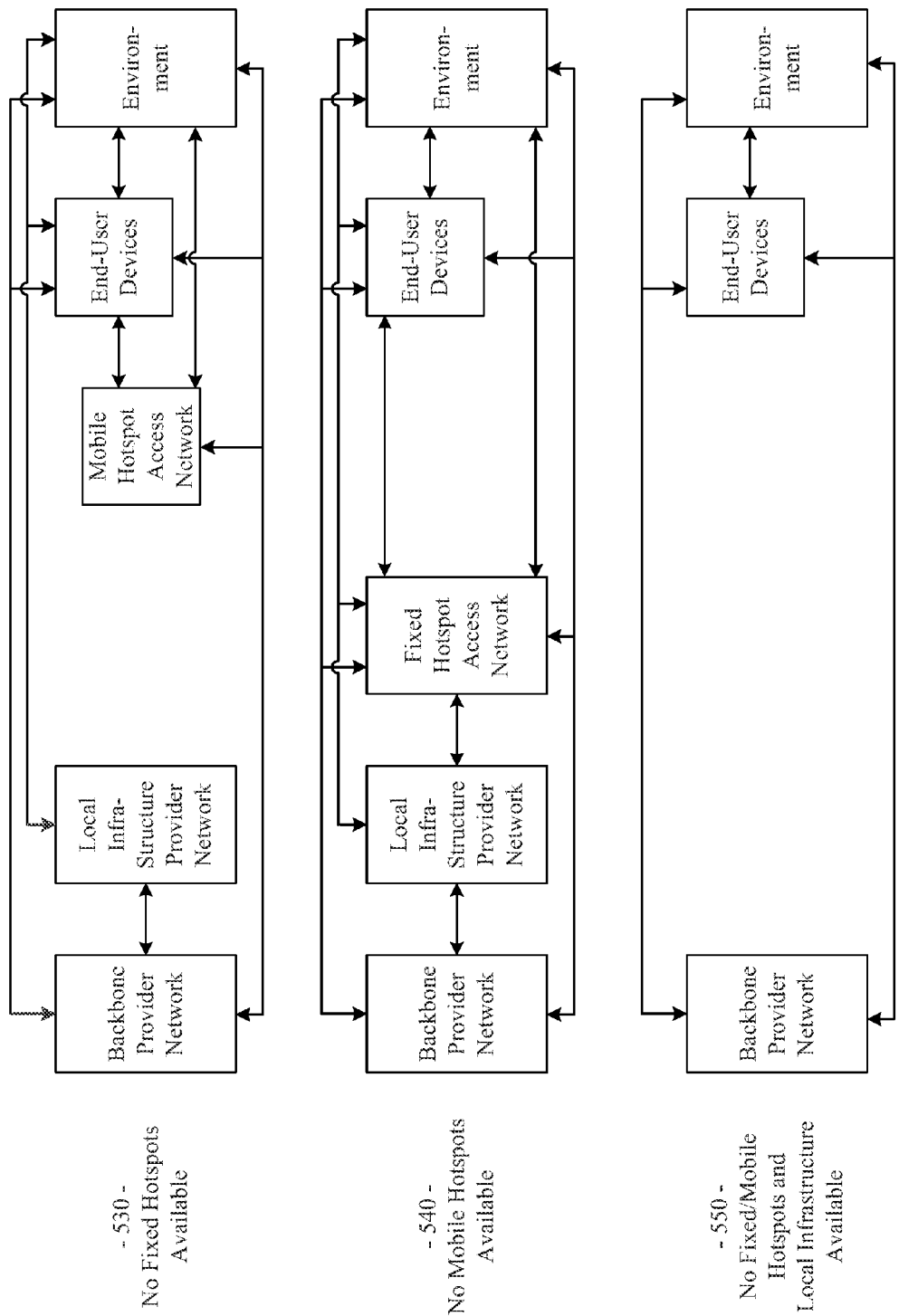
Figure 5C:
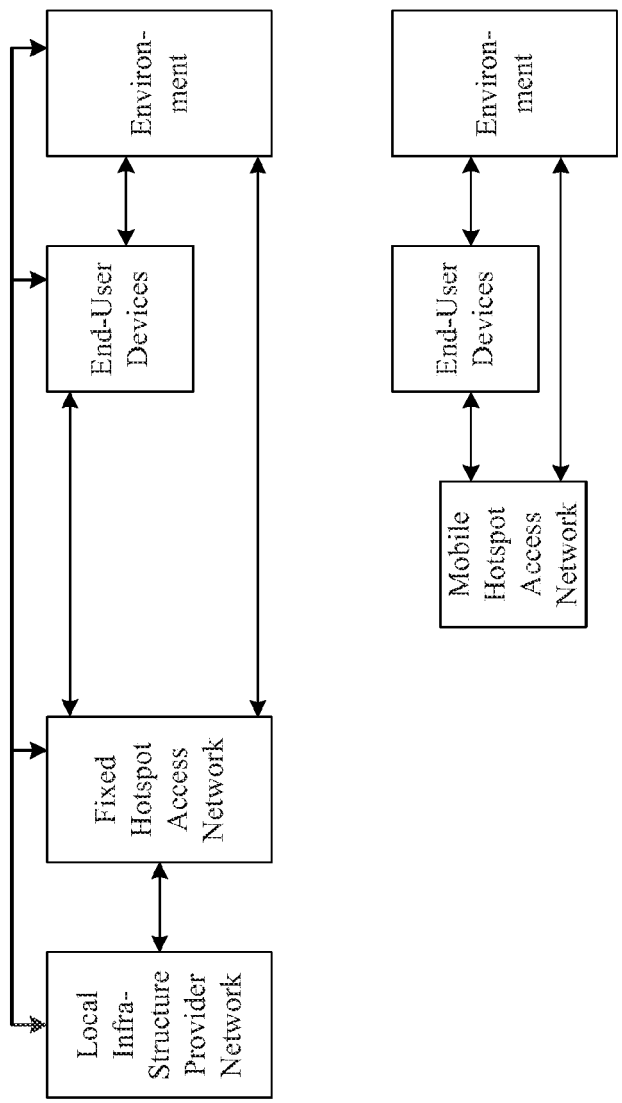

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, nodes, networks, and/or network components 100, 200, 300, 400, 600, 700, 800, 900, 1000, 1100, and 1200, shown and/or discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.).

For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
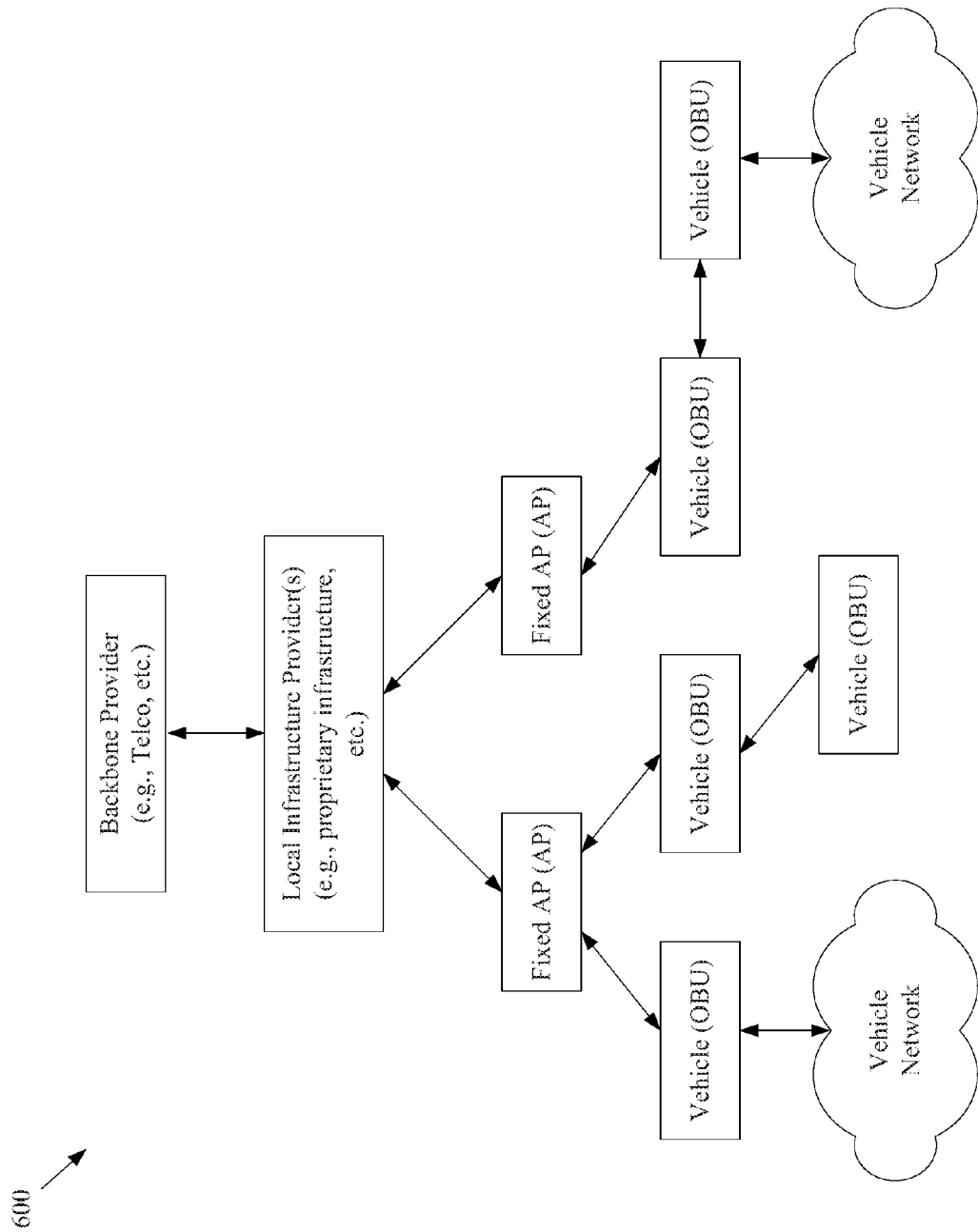
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, nodes, networks, and/or network components 100, 200, 300, 400, 500-570, 700, 800, 900, 1000, 1100, and 1200, shown and/or discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
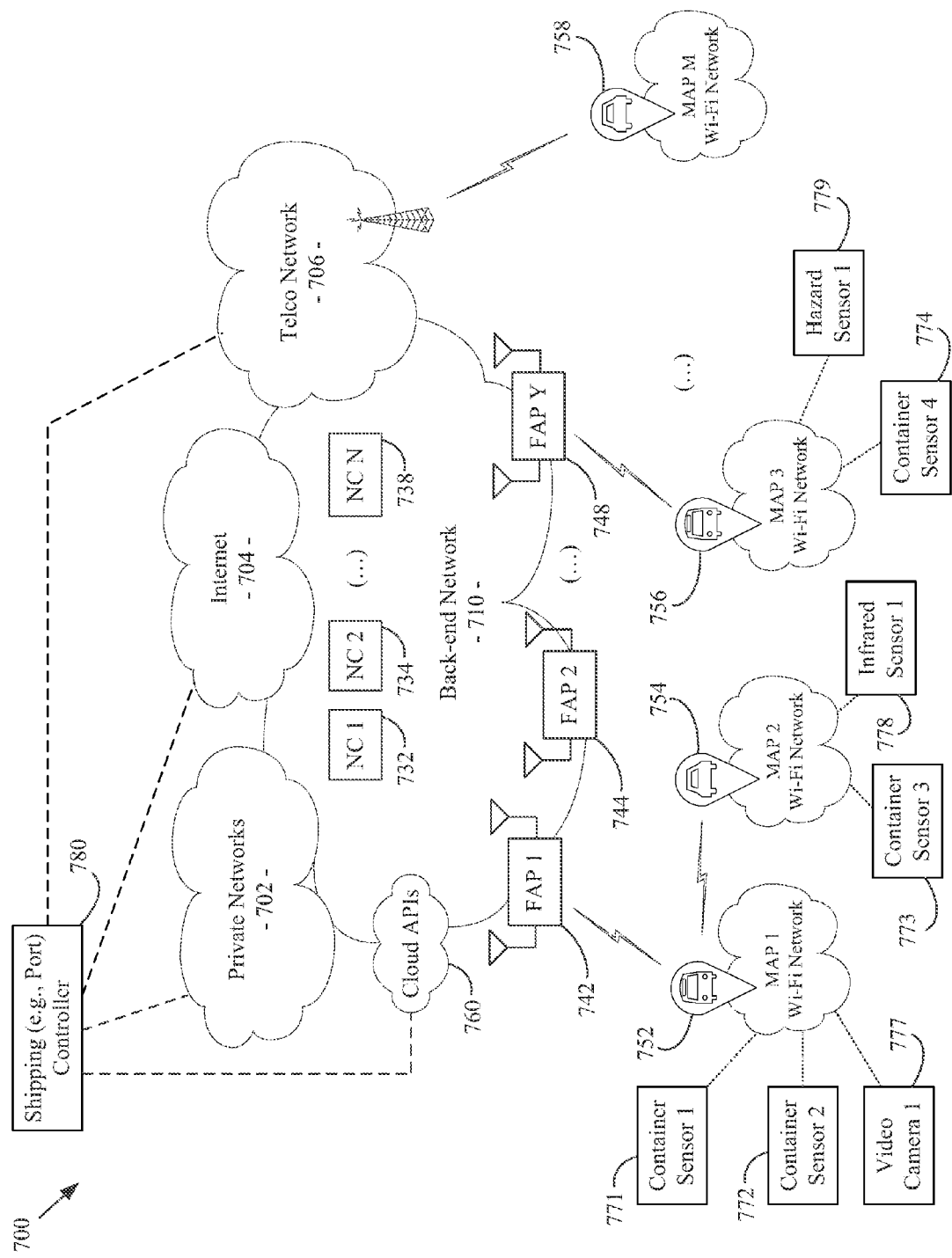
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example methods, nodes, networks, and/or network components 100, 200, 300, 400, 500-570, 600, 800, 900, 1000, 1100, and 1200, shown and/or discussed herein. Notably, the example network 700 shows a plurality of vehicles (or Mobile APs, or OBUs), each communicatively coupled to a Fixed AP (or RSU), where each Mobile AP may provide network access to a vehicle network (e.g., comprising other vehicles or vehicle networks, user devices, sensor devices, etc.), for example a Wi-Fi network to which end user devices may connect, with which communication with sensors may be performed, with which communication with control circuitry may be performed, etc. The Mobile APs (or vehicles in which the Mobile APs are installed) may, for example, have access to information from any of a wide array of sensors (e.g., cameras, microphones, gas or particle sensors, weather sensors, impulse sensors or accelerometers, velocity sensors, slip detectors, temperature sensors, position or location sensors, moisture detectors, pressure sensors, weight sensors, door or lid sensors, etc.). For example, one or more shipping container sensors may sense any of a variety of parameters associated with the shipping container (e.g., position sensing, fullness sensing, time/date sensing, location and/or travel route sensing, contents sensing, temperature sensing, orientation sensing, shock sensing, door opening/closing sensing, moisture and/or other climate sensing, etc.). The Mobile APs may, for example, gather (or collect) information from such sensors, make various autonomous decisions based at least in part on the gathered information, communicate such information to controllers (e.g., local controllers of vehicles, central shipping controllers, etc.), etc. Many non-limiting examples of such operation are provided herein.

As shown in FIG. 7, a Shipping Controller 780, for example a shipping container management system (e.g., a port management system, a train management system, a trucking management system, etc.) may be communicatively coupled to the network (e.g., to the Cloud, to the infrastructure, etc.) in any of a variety of manners. The Shipping Controller 780 or any portion thereof may, for example, be implemented in a Network Operations Center (NOC), etc. For example, the Shipping Controller 780 may be connected to a Cloud of a network operator, for example a Back-end Network 710 (e.g., through APIs 760, via a Private Network 702, via the Internet 704, via a Telco Network 706, any combination thereof, etc.). For example, the Shipping Controller 780 may be communicatively coupled to any of the nodes via a backhaul network.

Also as shown in FIG. 7, a vehicle network may be connected (e.g., communicatively coupled, directly or indirectly) to one or more local Container Sensors 771, 772, 773, and 774, Video Cameras 777, Infrared Sensors 778, Environmental Hazard Sensors 779, etc. The vehicle network may, for example, comprise any or all of the nodes discussed herein. For example, the vehicle network may comprise one or more Network Controllers (NCs) (e.g., NC 1 732, NC 2 734, . . . , NC N 738, etc.), one or more Fixed APs (e.g., FAP 1 742, FAP 2 744, . . . , FAP Y 748, etc.), one or more Mobile APs (e.g., MAP 1 752, MAP 2 754, MAP 3 756, . . . , MAP M 758, etc.), etc. Such nodes may, for example, be communicatively coupled in any of the manners discussed herein.

As shown in FIG. 7, the network of moving things may comprise a plurality of vehicles, each with a respective local vehicle network that may be coupled to other vehicle networks, user devices (e.g., smart phones, personal computing devices, smart watches, scanners, etc.), smart containers comprising any of a variety of sensors (e.g., container sensors, environmental sensors, position sensors, inertial sensors, cameras, microphones, temperature sensors, humidity sensors, gas and/or particle sensors, weight sensors, light sensors, etc.), sensors apart from containers (e.g., container sensors, environmental sensors, position sensors, inertial sensors, cameras, microphones, temperature and/or infrared sensors, humidity sensors, gas and/or particle sensors, weight sensors, etc.), etc. For example, a smart shipping container may comprise any of a variety of sensors and/or communication circuitry that may communicatively couple the smart container to a vehicle network of the network of moving things. A shipping container may, for example, comprise visual and/or RF identification tags, a shipping container may comprise circuitry that operates to communicate information of the shipping container's identity, contents, source, destination, location and/or travel route, age of contents, temperature, special handling needs, conditions to which the contents have been exposed, etc.

In a communication network constructed in accordance with various aspects of the present disclosure, a campus-wide, port-wide, distribution center-wide, city-wide, nation-wide, etc., network of sensors may be utilized to understand shipping dynamics in ways that were previously not possible or practical. Information gathered from shipping-related sensors can be very useful when making decisions that affect how shipping is performed. Such information provides a way to plan or schedule the utilization of shipping resources based on historical data and also a way to deviate from planned operation in response to detected real-time conditions (e.g., unexpected conditions, etc.) encountered during execution of a plan. Additionally, access to such data improves awareness of shipping problems or potential problems that may otherwise go unnoticed and/or unnoticed for an unacceptably long period of time.

In accordance with various aspects of the present disclosure, information retrieved from sensors (e.g., shipping container-related sensors, etc.) and communicated over the network of moving things is utilized to manage and optimize operations of the various shipping services provided to enterprises involved in shipping operations, enterprises or citizens utilizing shipping services, etc. Additionally for example, data gathered from sensors (e.g., shipping container-related sensors, etc.) may be provided to municipal entities, for example organizations and/or enterprises involved in providing infrastructure (or access thereto) for shipping. For example, such data may be utilized for traffic planning, road and/or rail maintenance activities, new infrastructure planning and/or maintenance of existing infrastructure, fuel and/or other energy resource planning, etc. Further for example, sensors related to shipping (e.g., shipping container-related sensors, etc.) may provide data by which a municipality or other government organization may detect environmental hazards or potential hazards in a timely manner.

In accordance with various aspects of the present disclosure, a network of moving things is utilized to collect (or harvest) data from multiple types of sensors scattered around a port, distribution center, campus, city, etc., positioned within or on shipping containers, positioned aboard vehicles (e.g., vehicles involved with shipping container management and/or movement, vehicles entirely unrelated to shipping, etc.), embedded within user handheld devices and/or clothing, etc. The network of moving things may, for example, deliver the collected sensor data to the Cloud in a reliable and affordable manner, providing for massive sensor data collections. The network of moving things is thus able to provide valuable data about cargo flow and its dynamics to enterprises, municipalities (e.g., infrastructure management committees, etc.), and other organizations, for example integrating a variety of types of data learning and analytics approaches.

In accordance with various aspects of the present disclosure, the network of moving things provides for storage of the gathered data and provides for access to the gathered data. For example, access to the gathered data is provided at high levels of the network of moving things (e.g., at the Cloud, at the infrastructure level, etc.) and/or at the low levels of the network (e.g., at the Mobile APs, at the Fixed APs, etc.).

In an example implementation, an extensive set of low-cost low-power (e.g., battery operated, solar operated, wind operated, etc.) sensors are positioned throughout a shipyard, train yard, truck yard, neighborhood, municipality, highway system, etc. Such sensors are able to communicate with access points (e.g., Mobile APs, Fixed APs, etc.) of the network of moving things, for example utilizing Wi-Fi or other wireless LAN technology, personal area networking (PAN) technology, inter-vehicle communication technology, etc. Additionally, such sensors may operate to communicate in accordance with any of a variety of communication protocols that have been developed for low-power communication (e.g., the CoAP protocol, etc.). If battery powered, sensors are generally operable in various low-power modes, in which the sensors may be wakened as needed (e.g., wakened by a passing Mobile AP, waked by a timer, wakened by movement, wakened by sound, etc.) to gather and/or communicate sensor data.

In accordance with various aspects of the present of disclosure, as vehicles of the network of moving things (e.g., the Internet of Moving Things) go about their general duties (e.g., as cargo loading/unloading vehicles, as cargo transportation vehicles, as shipping management or oversight vehicles, as buses, as waste collecting vehicles, as roadway maintenance vehicles, as mail delivery vehicles, as emergency services vehicles, as private transportation vehicles, etc.), such vehicles (e.g., Mobile APs or OBUs thereof) may operate to interact with sensors (e.g., sensors in or on shipping containers, sensors in or on the vehicles, sensors separate from shipping contains and the vehicles, etc.). Such sensors may, for example, directly concern operation of the respective vehicle, but in general, such sensors might be unrelated to the operation of the vehicle gathering the sensor data. For example, a passing bus may collect sensor information concerning the fullness of a shipping container, an environment inside a shipping container, a travel route of a shipping container, contents of a shipping container, shock conditions experienced by a shipping container, etc.

The collected data may, for example, be temporarily stored in the vehicle (e.g., in a memory of or attached to the Mobile AP, etc.). In various example scenarios, the collected data may also be processed onboard the vehicle (e.g., in a processor of the Mobile AP, in a processor of the vehicle, etc.), for example to calculate metrics, to summarize the data, to compress the data, etc. In such scenarios, the collected data and/or information characterizing the collected data may be immediately delivered to the Cloud or may be delivered to the Cloud in a delay-tolerant manner (e.g., to reduce communication costs, etc.).

Once the retrieved sensor data and/or metrics reach the Cloud, such sensor data and/or metrics may be provided to users in a raw format or processed to enhance usefulness. For example, a suite of APIs may be provided in the Cloud that provides convenient access to the gathered data and/or metrics for client (or controller) analysis. Additionally, in an example scenario, sensor data may also be delivered at the user level (e.g., sensor data regarding shipping container conditions, cargo health, shipping container planned or actual route, travel restrictions for a shipping container, environmental conditions of a shipping container, weather conditions, sensor data regarding operation of the vehicle, data associated with any of a variety of sensors on-board the vehicle, etc.).

Any of a variety of types of analysis may be performed on the gathered data, for example, to improve the shipping services offered by organizations and individuals. Various non-limiting example scenarios involving shipping (or shipping container) management are presented herein. It should be understood that the scope of this disclosure is not limited by characteristics of the example shipping scenarios or of any examples presented herein.

In an example scenario, an enterprise or government organization managing shipping (e.g., at a port, at a train yard, at a trucking depot or distribution center, in a city, over a highway infrastructure, etc.) can optimize shipping (e.g., shipping container and/or vehicle routes, schedules, etc.) based on current shipping needs, traffic and/or weather conditions, etc. Note that even in a scenario in which an optimal shipping service plan is implemented, real-time data associated with shipping containers (or vehicles moving such vehicles), environmental conditions, cargo conditions, shipping deadlines, etc. may also be considered to adjust such shipping service plan.

Figure 8:
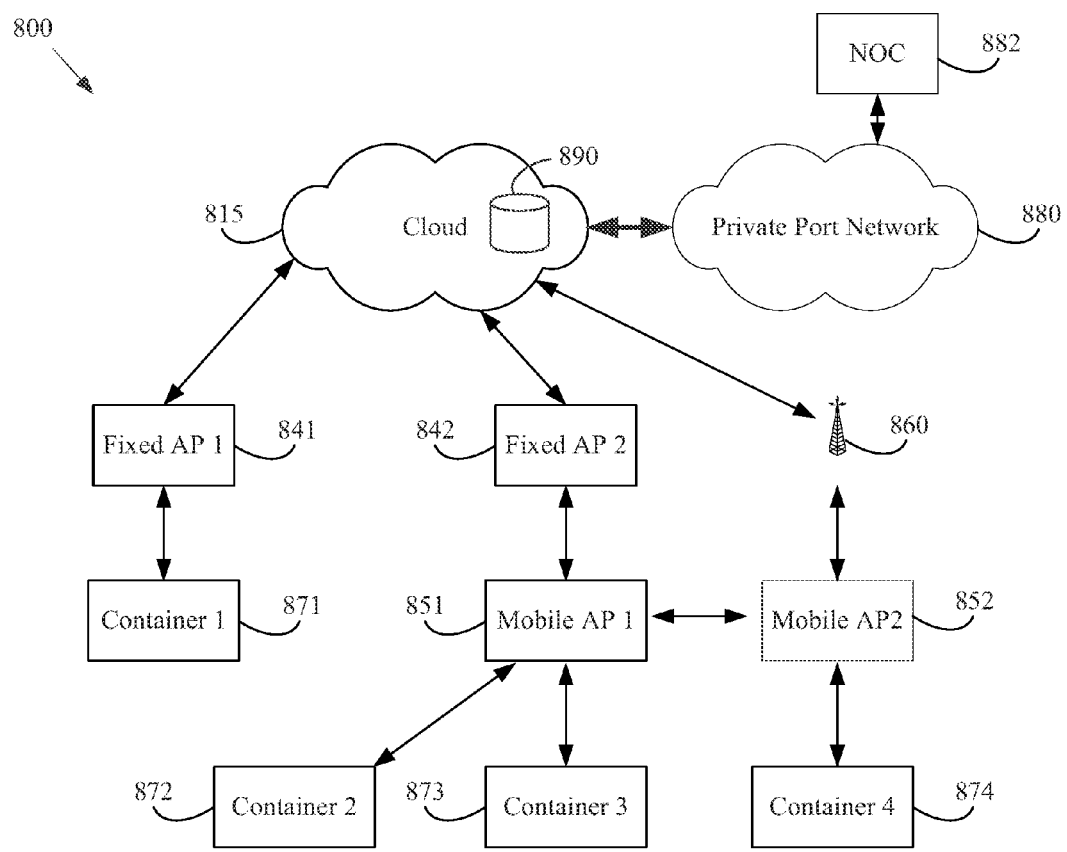
FIG. 8 shows a block diagram of an example communication network, in accordance with various aspects of the present disclosure.

Turning next to FIG. 8, such figure shows a block diagram of an example communication network, in accordance with various aspects of the present disclosure. The example scenario 800 may, for example, be implemented in a network and/or network component that shares any or all characteristics with the other example methods, nodes, networks, and/or network components 100, 200, 300, 400, 500-570, 600, 700, 900, 1000, 1100, and 1200, shown and/or discussed herein.

As shown in the example network 800, a Private Port Network 880 may be coupled to the proprietary Cloud 815 of an operator of the network of moving things and/or to a general public Cloud (e.g., the Internet, etc.). The example Private Port Network 880 comprises (or is communicatively coupled to) a Network Operations Center (NOC) 892 that provides a user interface to manage operation of a port. The example Cloud 815 is connected (e.g., communicatively coupled to, for example directly or via one or more intervening networks) to a plurality of Fixed APs 841 and 842, a cellular network or base station 860, etc., as discussed herein. Also as discussed herein, the Fixed APs 841 and 842 and the cellular base station 860 may be communicatively coupled to Mobile APs 851 and 852 of the network of moving of things. The Mobile APs 851 and 852 and/or Fixed APs 841 and 842 of the example network 800 may communicatively couple to smart shipping containers 871, 872, 873, and 874 (or sensors thereof) at the port. The smart shipping containers 871, 872, 873, and 874 may, for example, comprise on-board sensors that monitor any of a variety of conditions related to the containers (e.g., container location and/or travel route, temperature, vibration or shock history, spatial orientation history, noise, interior environment, exterior environment, power supply status, weight, security mechanisms, access, etc.). The smart shipping containers may also, for example, comprise memory in which information describing the container and/or contents thereof, movement history, ownership, source/destination, delivery time constraints, value, etc., may be stored. For example, the memory may store information describing container contents, a log of container events and travels, current destination and source, time in transit, dates/times when opened and closed, inspection details, whether the container is empty or full or to what extent the container is filled, cautions associated with the container and/or its contents, shipping due date or travel schedule, whether the container is powered or not, whether the container has passed inspection, etc.

In various example implementations, the sensor information (e.g., shipping container-related sensor information, shipping container movement plan information, sensor data collection plan information, etc.) may be stored in one or more databases 890 in the Cloud 815, for example in a raw format, or various metrics may be derived, as requested by the Network Operations Center (NOC) 882 (e.g., a Shipping Controller, a Shipping Container Manager, etc.) of a Private Port Network 880, etc. Though various examples may be presented herein in the context of a shipping port, the scope of this disclosure should not be limited to such context. For example, the scope of this disclosure readily extends to any of a variety of types of shipping operations (e.g., sea-going vessels, trains, trucks, bikes, etc.). The NOC 882 may, for example, periodically access the Cloud 815 (or database 890 thereof) (e.g., through specific Cloud APIs, etc.) to gather the information (e.g., in a solicited, or pull, manner), or the information can be sent directly to the NOC 882 without waiting for a request (e.g., in an unsolicited, or push, manner).

The example network 800 may, for example, provide the capability for the NOC 882 to communicate with any or all nodes (or sensors) discussed herein via a backbone communication network 860 (e.g., directly via a cellular communication network 860, via a cellular communication network 860 and second Mobile AP 852 and/or other nodes of a vehicle communication network, etc.). The example network 800 may also, for example, provide the capability for the NOC 882 to communicate with any or all nodes (or sensors) discussed herein via various nodes of a vehicle communication network (e.g., with a first container sensor 871 via a first Fixed AP 841, with a second container sensor 872 and/or a third container sensor 873 via a second Fixed AP 842 and a first Mobile AP 851, with a fourth container sensor 874 via a second Fixed AP 842, first Mobile AP 851, and second Mobile AP 852, etc.). The example network 800 may also, for example, provide the capability for the NOC 882 to communicate with any Fixed or Mobile AP of the vehicle communication network (e.g., with a first Mobile AP 851 via a second Fixed AP 842, with a second Mobile AP 852 via a cellular communication network 860, etc.). In general, the NOC 882 may communicate information with any node (or sensor) via any of the communication pathways discussed herein.

Note that the communication pathway(s) selected for communication between a NOC 882 (e.g., a central shipping controller, etc.) or distributed shipping controller and other nodes (or sensors) may be specified in a configuration profile and may be adaptable in real-time. For example, in an emergency or high-priority scenario, a central shipping controller (or distributed shipping controller) may communicate with a local sensor (e.g., a shipping container sensor) and/or Mobile AP (or vehicle thereof) via a cellular network. Also for example, during a normal or low-priority or non-emergency scenario, the central shipping controller (or distributed shipping controller) may communicate with a local sensor and/or Mobile AP via the vehicle communication network. In another example scenario, the central shipping controller may (e.g., for a particular type of vehicle, for example a public transportation vehicle or other vehicle not related to shipping activity) be configured to always communicate with the Mobile AP thereof via the vehicle network, or to always communicate via the vehicle network unless in a failover situation.

A network of moving things, in accordance with various aspects of the present disclosure, provides a diverse set of organizations the opportunity to participate in and/or benefit from the network of moving things. For example, as discussed herein, the Cloud (e.g., a database thereof, a Central Shipping Controller server thereof, etc.) collects the sensor data, stores the sensor data, and provides access to the data (e.g., through APIs) to the organizations (or systems or servers thereof) having interest in the data. Also for example, the Cloud may comprise data processing algorithms (e.g., executed by servers in the Cloud, etc.) as desired that may also analyze the collected data, for example calculating various metrics that are made readily accessible to the organizations. Note that such access may be restricted in accordance with the security needs of the organizations. Accordingly, governments, citizens, service organizations, ports, municipalities, trucking centers, train yards, etc. may all develop a better understanding of the problems to be managed and/or the services to be provided.

As more and more data is collected and stored, smart algorithms, for example based on machine learning techniques, may be utilized to build predictive models of shipping dynamics, for example shipping container routes or plans, storage plans, traffic flows, etc., allowing for the efficient utilization of shipping resources, municipal infrastructure resources, manpower resources, storage resources, maintenance resources, energy resources, etc. For example, the collected sensor data (e.g., shipping container-related data, etc.) may be analyzed to determine or infer the trends/demands for shipping, etc. Also for example, the provisioning of resources may be optimized to make the most of available resources (e.g., port or distribution center resources, loading/unloading equipment, cargo moving resources, shipping resources, transportation infrastructure resources, human resources, machine resources, monetary resources, maintenance resources, etc.). Additionally for example, with a relatively large set of data (e.g., a large statistical sample size), such data may be analyzed to reliably predict need, but may also be analyzed to detect anomalies that are in need of further investigation. For example, the detection of a statistically unlikely event (e.g., a value unexpectedly above a particular threshold or statistical control number, an unlikely trend in the data, etc.) may trigger an investigation.

As discussed herein, different types of sensor data may have different respective reporting or analysis priorities. Priority may also, for example, be a function of time-of-day and/or day-of-week, a function of the data itself (e.g., data indicating an emergency condition, data indicating an unexpected environmental condition, data indicating a "lost" condition, data indicating a shipping container condition of concern, data indicating an unanticipated container access, data indicating an unexpected shock or impact, data indicating an unexpected temperature, etc.), a function of a user input from the Cloud indicating that a particular type of data is presently high-priority data, a function of geographical location, etc. Thus, in accordance with various aspects of this disclosure, the manner in which the collected data is communicated to the Cloud (or to a client directly) through the network of moving things is adaptable. For example as discussed herein, delay-tolerant data may be propagated through the network as convenient and/or economically prudent, but real-time critical data may be propagated through the network via a fastest and/or most reliable path (e.g., via a cellular path, via a fastest infrastructure path, via multiple paths for redundancy, etc.). The network of moving things is capable of providing these options.

The manner in which the sensor data is processed and/or the equipment performing the processing may also adapt based on time constraints. For example, when the processing of particular data (e.g., shipping container identification and/or location data, shipping container environmental condition data, etc.) is not relatively urgent, such processing may be performed in the Cloud at some point after the collected data is accumulated. Also for example, when the processing of particular data is real-time critical (e.g., for location of a lost shipping container, for reporting a dangerous or potentially dangerous environmental condition inside or outside of a shipping container, for an emergency waste clean-up situation, etc.), the analyzing of such data may be performed in the network closer to the source (e.g., at a Mobile AP, at a computer that is part of the network of a vehicle, at a local Network Controller, etc.).

As discussed herein, the security, integrity, and privacy of the collected data may be a concern. Accordingly, the various levels of the network of moving things may comprise respective security measures (e.g., token-based authentication for API access, Datagram Transport Layer Security (DTLS) functionality for communication between sensors and vehicles, general cryptographic capability, etc.).

Note that although the examples presented herein generally focus on shipping container sensors, the scope of this disclosure is not limited thereto. For example, sensors separate from smart containers but generally related to port and/or shipping operations may be incorporated into the system as well (e.g., movement cameras, environmental sensors, infrared or other temperature sensors, x-ray sensors, weight sensors, container inspection sensors, container measuring sensors, sensors for vehicles utilized in port operations, personal sensors for port operators, traffic sensors, etc.).

A network of moving things in accordance with various aspects of the present disclosure may substantially reduce the occurrence of lost or missing shipping containers. In an example scenario, whenever a vehicle (e.g., a vehicle that is related to shipping operations, a vehicle that has no direct relationship to shipping operations, etc.) passes within communication range of a container, a record of the container's location and/or state or condition may be updated. For example, a Mobile AP of the vehicle can communicate with the container and then communicate information of the container to the Cloud (e.g., to a database 890 of the Cloud 815, etc.). The collected container information may be gathered and/or communicated to the Cloud 815 (and thus be made available to the Private Port Network 880) in a delay-tolerant manner and/or in a real-time manner.

An accurate accounting of container locations and/or conditions may provide for increased loading and/or unloading efficiency. The routing of container movement vehicles (e.g., trucks, cranes, forklifts, trains, ships, etc.) may be optimized, increasing loading and unloading efficiency, reducing traffic and thus emissions and fuel utilization and maintenance needs, increasing safety through reduced traffic and tightly controlled traffic patterns, etc.

Containers may, for example, comprise radio frequency identification (RFID) components, QRCode or barcode components, etc. Each vehicle (e.g., Mobile AP or OBU thereof) may, for example, comprise Dedicated Short Range Communication (DSRC) capabilities to facilitate connection (e.g., continuous connection) to the communication infrastructure of the port or distribution center (e.g., to stationary communication nodes, mobile communication nodes, etc.). Also for example, the OBUs may comprise memory in which to store collected container information and communicate such information to the Cloud (e.g., to a database thereof) whenever the opportunity arises (e.g., when the Mobile AP is within range of a Fixed AP, within range of another Mobile AP, within range of a Wi-Fi hotspot, etc.).

Using the wireless capabilities, the OBU can automatically detect which container will be moved. In case of a QRCode, a handheld scanner device can be used by the operator or a vehicle mounted scanner may be utilized. The Mobile AP (or OBU) of the vehicle may then communicate the collected data to the Cloud (e.g., using 802.11p technology, cellular technology, etc.). At the Cloud, any of a variety of analytical tools may be utilized to process the collected data and/or determine metrics therefrom. For example all of the information collected by and/or communicated through the network of moving things may be accessible to a Network Operations Center (NOC) (e.g., like the NOC 882 of the Private Port Network 880, etc.).

Attaching/Crossing the ID of the container to the OBU (that is directly associated with a truck ID/plate), all of the information that comes from the container may be monitored and tracked in real-time. For example, even an unloaded truck without any container may be tracked. As discussed herein, a driver may be provided with an optimized route to follow. As the driver's vehicle location is tracked, if the driver is taking too long or if the driver is not on the correct path, alerts may be displayed to the driver and/or to a central shipping controller. Such alerts may, for example, be communicated to the driver inside or near the truck (e.g., via smartphone, tablet, heads-up display, etc.). Also for example, alerts may be communicated via a programmable sign (e.g., a roadside information display). Note that in various scenarios, alerts may also be provided directly to various municipal or government organizations (e.g., law enforcement, homeland security, import/export authorities, etc.).

In accordance with various aspects of the present disclosure, the network of moving things may be fully integrated with the Private Port Network 880 (e.g., via Cloud APIs). The efficiency of container delivery will be substantially increased. Location tracking will also be improved, for example with real-time monitoring of each container. Fuel consumption will be decreased. The drivers may spend more time within the vehicle, resulting in increased operator safety. Reports may be efficiently formed, for example detailing arriving and/or leaving containers.

Utilizing a network of moving things, in accordance with various aspects of the present disclosure, the collection of data may be highly automated, for example without human intervention at the time of collection, communication, and/or processing.

In an example implementation, thermal cameras may be utilized to monitor refrigerated containers. Such containers may, for example, have issues effectively communicating information. The smart containers may, for example, comprise GPS capability. With GPS technology and having another dimension of information (e.g., having 3D positioning information, cellular triangulation capability, etc.), information that has been captured (e.g., in parallel) may be checked. This may, for example, be useful in cases in which precision is lacking and for debug/validation. In an example scenario in which data was collected from two containers (one from the top of a container stack and another from the ground level of the container stack), there may be containers in the middle of the stack that are not collecting and/or communicating information. Such containers may now be detected, for example by building a three-dimensional stacking model.

Note that as discussed herein, for example with regard to Mobile APs, smart containers may similarly be able to communicate with each other (e.g., forming a container mesh network, etc.). In such a scenario, containers that may be shielded from a Mobile AP (e.g., shielded by other containers, etc.) may communicate with a Mobile AP via other containers.

It should be noted that Fixed APs (or non-mobile or parked OBUs) may be installed in dead zones and/or parts of a port where there are no or few vehicles. Also, though GPS has been discussed herein, various other positioning technologies may also be utilized. For example, DSRC triangulation may be utilized (e.g., instead of GPS and/or to augment GPS).

In an example port implementation, for example in which the cranes/stackers operators only know that they will receive a container with a few minutes notice, the network and/or system in accordance with various aspects of the present disclosure provides for the efficient delivery of container information, which may be utilized to more efficiently stage a set of containers for loading.

In another example implementation, the Mobile APs in accordance with various aspects of the present disclosure may be utilized to provide Wi-Fi (or other WLAN) connectivity to users. For example, as discussed herein, the Mobile AP may provide connectivity to user devices of drivers and/or passengers of a vehicle, users outside of but nearby the vehicle, etc.

In a further example implementation, a boat (or watercraft) mesh may be created that extends out to sea beyond where conventional cellular is provided. In such a scenario, freight information (e.g., shipping container information, etc.) and/or passenger information (e.g., passenger identification information, biometric data, immigration or visa data, etc.) may be uploaded while a ship is still in international waters.

In yet another example implementation, as discussed herein, any of a variety of sensors may be incorporated into the system. Various sensors (e.g., cameras, impact sensors, orientation sensors, vehicle sensors, microphones, etc.) may be utilized to detect accidents. Other information, for example positioning information, may also be utilized. In an example scenario that includes an accident, the sensor information indicative of the details of the accident may be uploaded to the Cloud to assist the port authority (or other agency) in responding.

Note that cameras and biometric sensors, which have been discussed herein, may be utilized at port checkpoints to monitor employees and visitors. The personal security information may be communicated to the Cloud, where information of persons of interest may be stored for comparison.

Figure 9:
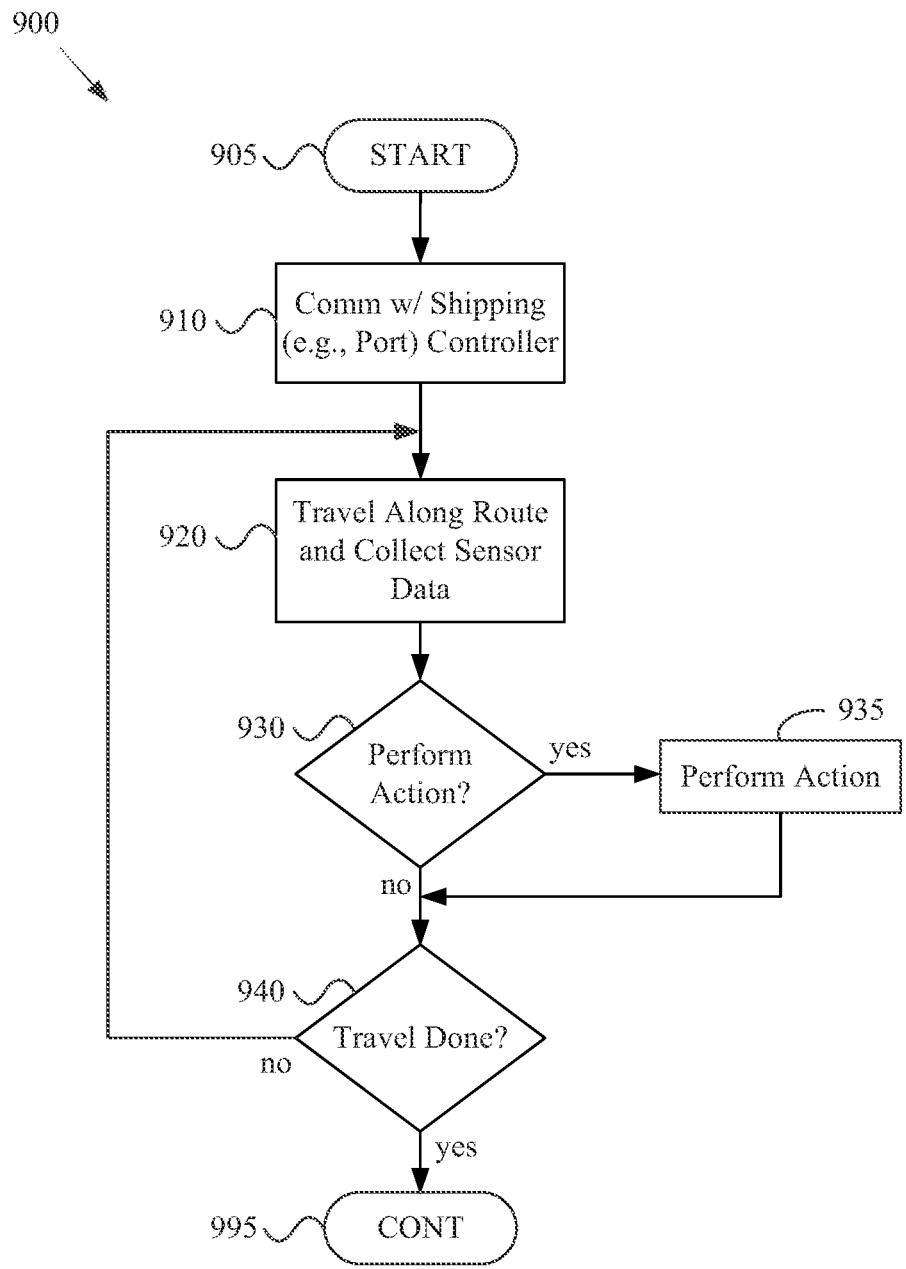
FIG. 9 shows a flow diagram of an example method of controlling shipping, in accordance with various aspects of the present disclosure.

FIG. 9 shows a flow diagram of an example method 900 of controlling shipping, in accordance with various aspects of the present disclosure. The example method 900 may, for example, share any or all characteristics with the other example methods, nodes, networks, and/or network components 100, 200, 300, 400, 500-570, 600, 700, 800, 1000, 1100, and 1200, shown and/or discussed herein. The example method 900, or any portion thereof, may for example be implemented in a Mobile AP or a plurality thereof. Also for example, the example method 900 or any portion thereof may, for example, be implemented in a Fixed AP, Network Controller, Central Shipping Controller, any node discussed herein, etc.

The example method 900 begins executing at block 905. The example method 900 may begin executing in response to any of a variety of causes or conditions, non-limiting examples of which are provided herein. For example, the example method 900 may begin executing in response to a user command to begin, in response to a signal received from a network node (e.g., from a networked database, from a Central Shipping Controller (e.g., a NOC, etc.), from a local shipping controller of a vehicle or MAP thereof, from a networked client dashboard, etc.), in response to a detected shipping condition (e.g., a shipping container condition, a shipping vehicle condition, a shipping service plan, etc.), in response to a detected emergency condition, in response to a timer, in response to a power-up (or turn on or reset) event at the system implementing any or all aspects of the example method 900, etc.

At block 910, the example method 900 comprises communicating with a Central Shipping Controller (e.g., a port controller, a trucking controller, a distribution center controller, etc.) regarding one or more services being provided (e.g., shipping services, etc.) or related conditions. Such communication may comprise any of a variety of characteristics. For example, block 910 may comprise receiving information from the Central Shipping Controller concerning how the Mobile AP is to conduct its data collection activities (e.g., data collection control information). For example, such information may comprise information concerning sensors (e.g., shipping container sensors of smart shipping containers, etc.) with which the Mobile AP is to communicate to obtain sensor information (e.g., sensor or container geographical location, sensor or container network address and/or other identifying information, sensor or container type, etc.). Also for example, such information may comprise information identifying when the Mobile AP is to collect (or gather) data from various sensors. Additionally, for example, such information may comprise information regarding the manner in which the Mobile AP is to communicate collected data to the Central Shipping Controller (or database(s) accessed thereby). For example, such information may indicate whether data collected from a sensor is to be communicated immediately (e.g., via a cellular communication network, via the vehicle communication network, etc.), whether the data is to be communicated within a particular amount of time (e.g., within a number of seconds, within a number of minutes, etc.), whether the data has a higher priority than other data, etc. Note that the communication of block 910 may be performed at any time throughout execution of the example method 900, for example at any block thereof.

The information received from the Central Shipping Controller may also, for example, comprise service providing command information. A Central Shipping Controller may, for example, communicate control commands to local shipping service providing vehicles (or Mobile APs thereof), for example to a container loading/unloading vehicle, a container transportation vehicle, etc. Such commands may, for example, be originated by the Central Shipping Controller and communicated through one or more Mobile APs and/or Fixed APs. In an example scenario, a Central Shipping Controller may communicate a "load" command through a Mobile AP that is within communication range of a container loading vehicle (or Mobile AP thereof) capable of implementing the "load." In another example scenario, the Central Shipping Controller may communicate a "no load" command for a particular container loading vehicle to the vehicle communication network, which then has the responsibility to propagate the command to the particular loading vehicle through one or more access points (e.g., FAPs, MAPs, etc.) that are geographically close to the particular loading vehicle.

In general, block 910 may comprise the Mobile AP communicating with a Central Shipping Controller regarding shipping and/or data collecting. Accordingly, the scope of this disclosure should not be limited by characteristics of any particular manner of such communicating, of any particular type of information related to shipping and/or data collection control, etc.

At block 920, the example method 900 may comprise the Mobile AP collecting sensor data as the Mobile AP (or vehicle carrying the Mobile AP) travels along a route. Note that the route may be predefined (e.g., a container collection and/or movement route, a port or distribution inspection route, etc.), partially defined (e.g., a security patrol beat, etc.), generally random, etc. In an example scenario, the Mobile AP (or vehicle or operator thereof) may have received route information (e.g., a shipping container collection plan, etc.) at block 910.

As the Mobile AP travels along the route, the Mobile AP may operate to collect sensor data from sensors (e.g., sensors in and/or on shipping containers, sensors in and/or on a vehicle of the Mobile AP, sensors positioned at specific locations and not coupled to shipping containers and/or vehicles, etc.) along the route. Some or all of the sensors may, for example, have been identified at block 910. In an example scenario, at block 910 the Mobile AP may have received a list of secure sensors from which the Mobile AP is to collect data, where the list includes geographical locations of the sensors, security codes for the sensors, operational characteristics (e.g., sleep mode characteristics, communication protocol characteristics, etc.) for the sensors, instructions for how to handle data gathered from the sensors, etc. Note that the Mobile AP may operate to collect data from a wide variety of different types of sensors, each of which may be associated with a different respective type of service. As a Mobile AP gathers data from one or more sensors, execution of the example method 900 may flow to block 930. Note that block 920 may comprise the Mobile AP collecting data directly from the sensor(s), but may also comprise collecting the data (or related information) by receiving the data from another node (e.g., from another Mobile AP that has collected the data, from a shipping container different from the shipping container originating the data, from any other node of the communication networks discussed herein, from a Central Shipping Controller, etc.).

At block 930, the example method 900 may comprise determining whether the Mobile AP is to perform one or more actions related to the collected data. Such actions comprise any of a variety of characteristics. For example, a first example action may comprise the Mobile AP communicating the collected data to a Cloud-based database, to a Cloud-based Central Shipping Controller, to a particular networked client system (e.g., to a client's proprietary network, to a NOC, etc.), to one or more other Mobile APs (e.g., directly or through the vehicle communication network, etc.), to a fleet of Mobile APs corresponding to a particular service, to a shipping control module on-board the Mobile AP or corresponding vehicle, etc.

In an example scenario, the Mobile AP may analyze the collected sensor data to determine a manner in which to communicate the collected sensor data (or information generally related to the collected sensor data). For example, the Mobile AP may compare identity information (e.g., shipping container identity information, cargo identify information, etc.) to a list of identities (e.g., a list of containers from which the Mobile AP is to collect sensor information, a list of lost containers that the Mobile AP is to be on the lookout for, etc.) to determine whether and/or how to communicate information related to a container. Also for example, the Mobile AP may compare the collected sensor data to one or more threshold values to determine whether the Mobile AP should immediately communicate information related to the collected data (e.g., through a cellular communication network, through the vehicle communication network, etc.), whether the Mobile AP should communicate information related to the collected data to a destination relatively soon but with no real-time constraints (e.g., opportunistically through the vehicle communication network, in a delay-tolerant manner, etc.), whether the Mobile AP should wait until the end of a shift (or route) to communicate the information (e.g., when the vehicle of the Mobile AP has returned to a hub or dispatch center, etc.), etc. In an example scenario, the Mobile AP may have been informed (e.g., at block 910, etc.) of the manner in which communication of information related to the collected sensor data is to be performed. Note that determining the manner in which information related to collected sensor data (e.g., raw sensor data, summarized sensor data, compressed sensor data, etc.) is communicated may depend, at least in part, on the value of the data. For example, the condition sensed by the sensor may determine the urgency with which information related to the collected sensor data is communicated.

A second example action may, for example, comprise the Mobile AP (or other system of the vehicle carrying the Mobile AP) analyzing the data to determine whether a service plan (e.g., a shipping container loading plan, a shipping container maintenance plan, a travel plan, etc.) of the vehicle carrying the Mobile AP (or other vehicle) should be modified. In an example scenario, the Mobile AP may be carried by a vehicle that is providing a shipping service to which the collected sensor is related. For example, the Mobile AP may be carried by a shipping container loading and/or transporting vehicle. The Mobile AP, having received the sensor data (or information related to the sensor data), may analyze such data (or information) to determine whether the present shipping container loading plan guiding operation of the vehicle (and crew thereof) should be modified. For example, as discussed herein, an unexpected situation (e.g., a lost shipping container that has been found, a shipping container that is suspected of being tampered with, a shipping container with a failing environmental control system, etc.) may arise while the vehicle is performing its shipping-service duty according to a predefined shipping service plan (e.g., which may have been received at block 910). In response to information related to the sensor data indicating that the shipping container is urgently in need of attention, the Mobile AP may determine that the shipping-service providing plan should be altered. Such a decision may, for example, be based at least in part on the sensor data value (e.g., relative to a list of container identities, etc.), a sensor data level (e.g., relative to one or more thresholds, analyzed in light of statistical expectations (e.g., averages, standard deviations or variances, etc.), time-of-day, day-of-week, geographical location, the location of the shipping container relative to the vehicle and/or the vehicle's planned route (e.g., whether the location has already been passed, whether the location has yet to be passed etc.), etc.

Other example actions that may be taken by the Mobile AP may, for example, comprise alerting a user (e.g., a driver or controller of a vehicle, a dispatcher, etc.) of a detected shipping container condition, communicating to the sensor (and/or a customer associated with the sensor) that the sensor data has been received and/or successfully reported, etc.

As mentioned herein, information received by the Mobile AP at block 910 may comprise information governing actions that the Mobile AP is to take with collected data. Such information may, for example, identify the criteria that must be met (e.g., specific sensor data value, sensor data level threshold, time constraints, etc.) for any particular action to take, the manner in which an action is to be performed, the degree of autonomy that the Mobile AP has with regard to decision-making (e.g., whether the Mobile AP is free to make its own decisions, whether the Mobile AP must ask for permission for a proposed action from a Central Shipping Controller before acting, whether the Mobile AP may act autonomously only when received information (e.g., sensor data, etc.) meets certain criteria, only when a vehicle operator indicates human approval of a proposed action, etc.

In general, block 930 may comprise determining whether the Mobile AP is to perform one or more actions related to the collected data. Accordingly, the scope of the present disclosure should not be limited by characteristics of any particular action, manner of determining whether to perform an action, etc.

At block 935, the example method 900 comprises performing the action(s) identified at block 930.

At block 940, the example method 900 comprises determining whether the vehicle's travel is complete. For example, block 940 may comprise determining whether a shipping vehicle's route (or plan) has been completed, whether a security patrol has been completed, whether a public transportation vehicle's route has been completed, whether a road maintenance schedule for the day has been completed, whether a postal delivery route has been completed, whether a bus route has been completed, etc. If not, then execution of the example method 900 flows back up to block 920 (or any block of the example method 900, any method step discussed herein, etc.) for continued traveling, sensor data collecting, etc. If so, then execution of the example method 900 flows to block 995 for continued operation.

At block 995, the continued operation may comprise performing any of a variety of activities. For example, as discussed herein, particular types of information related to collected sensor data may be delay tolerant enough to communicate such information at the end of a route. For example, as a vehicle returns to a dispatch center (or hub) at the end of a route or shift, block 995 may comprise communicating any or all of the information discussed herein via a wireless communication network of the dispatch center. Such operation may, for example, refrain from unnecessarily utilizing communication bandwidth of the vehicle communication network. Also for example, block 995 may comprise performing continued analysis of data, communicating with other Mobile APs regarding the data collection activity or any other matter, upgrading software, forming and/or downloading service (or shipping) plans for a next shift, etc.

Various aspects of the present disclosure will now be presented with example operating scenarios. In an example scenario, a Mobile AP (e.g., at least one module thereof) may operate to establish communication links directly with other mobile access points. For example, as discussed herein a Mobile AP may form a vehicle mesh communication network that includes other Mobile APs, Fixed APs, Wi-Fi hotspots, cellular base stations, smart containers, etc. The Mobile AP (or MAP) may, for example, be carried by a vehicle that is providing a shipping service (e.g., loading/unloading shipping containers, transporting shipping containers, etc.). For example, the Mobile AP may be carried by a crane, fork lift, moving van or truck, ship, etc.). Also for example, the Mobile AP may be carried by a vehicle that is generally associated with the shipping enterprise (e.g., providing harbor or distribution center security, managing operations, maintenance vehicles, employee transport vehicles, etc.) but not directly involved with handling shipping containers. Additionally, for example, the Mobile AP may be carried by a vehicle that is not related to providing a shipping service (e.g., a public transportation vehicle, a road maintenance vehicle, an emergency services vehicle, a taxi, a private vehicle, a general transportation vehicle, etc.).

The Mobile AP may also, for example, provide communication services (e.g., wireless LAN communication services, Internet access services, proprietary network access services, general communication services, etc.) to individuals, for example personal communication devices thereof (e.g., smart phones, smart watches, notepad computers, laptop computers, etc.). For example, the Mobile AP may provide communication services to drivers and/or passengers of the vehicle carrying the Mobile AP and/or to persons nearby the vehicle, and the communication services may be general communication services and/or may be specifically dedicated to the providing of shipping services (e.g., an enterprise VoIP phone, etc.).

As the Mobile AP (or vehicle thereof) travels along a route (e.g., a predetermined or defined route, a random route, a general but non-specific route, etc.), the Mobile AP may operate to establish communication links directly with sensors positioned along a travel route of the MAP. For example, as shipping container sensors (or systems) are within range of the Mobile AP (note that the shipping containers and/or Mobile APs may be moving), the Mobile AP may collect shipping container-related sensor data from the sensors. Many examples of shipping container-related sensor data are provided herein.

The Mobile AP may then, for example, communicate information related to the collected shipping container-related sensor data to a second system. For example, the information related to the collected shipping container-related sensor data may comprise raw data obtained from the sensor, metrics calculated by the Mobile AP and related to the collected sensor data, average values calculated by the Mobile AP, compressed data, location information, shipping container identification data, any of the sensor data discussed herein, etc. The second system may, for example, comprise a Central Shipping Controller (e.g., a Port Controller, a Distribution Center Controller, etc.) and/or Cloud database, another Mobile AP, a Fixed AP, a user device communicatively coupled to the Mobile AP, etc.

As discussed herein, the Mobile AP may operate to select at least one of a plurality of manners in which to communicate the information to the second system (e.g., in real-time, in a delay-tolerant manner, via a cellular link or other backbone network, via the vehicle network, via a detected Wi-Fi hotspot, etc.). In an example scenario, the Mobile AP may operate to determine whether to communicate the information to the second system via a vehicle communication network and/or via a cellular communication network. In another example scenario, the Mobile AP may operate to determine whether to communicate the information to the second system in real-time and/or in a delay-tolerant manner.

The Mobile AP may select the one or more of the plurality of manners in which to communicate in any of a variety of manners, non-limiting examples of which are provided herein. For example, the Mobile AP may select one or more of the plurality of communication manners based, at least in part, on a value of the collected shipping container-related sensor data. For example, the Mobile AP may determine to immediately communicate sensor data indicative of a dangerous shipping container condition (e.g., temperature or other sensed parameter outside of a safe range or range of acceptable values, detected potential chemical spill, detected biohazard, detected radiation, etc.) to the second system. Also for example, the Mobile AP may determine to immediately communicate sensor data indicative of a lost or stolen shipping container to the second system. Further for example, the Mobile AP may determine to immediately communicate sensor data associated with a shipping container that (e.g., based on time-of-day, day-of-week, date, etc.) is late or in danger of being late. Additionally for example, the Mobile AP may determine to communicate information generally identifying shipping containers and their locations in a delay-tolerant manner when the collected sensor data is indicative of a normal or expected shipping container condition. Also for example, the Mobile AP may determine the manner in which to communicate information related to the collected sensor data based on a programmable profile downloaded to the Mobile AP (e.g., configuration parameters indicating the conditions under which the Mobile AP is to communicate information related to the collected sensor data in various respective manners).

As discussed herein, the Mobile AP may operate to collect sensor data based, at least in part, on data collection control information that is downloaded to the Mobile AP. Such downloading may, for example, be performed while the vehicle carrying the Mobile AP is not operating, but may also be performed while the vehicle is traveling. For example, a Central Shipping Controller (or other node) may determine that it wants additional information concerning a particular shipping container, identify a next Mobile AP that is expected to be within range of the particular shipping container, and download command (or configuration) information to such next Mobile AP to collected the desired data from the particular shipping container. As discussed herein, such configuration or control information may indicate the manner in which the collected sensor data is to be collected, communicated, processed prior to communication or otherwise analyzed, etc.

In an example scenario in which the Mobile AP fails to establish (or adequately establish) a communication link with a shipping container (or sensor thereof), the Mobile AP may communicate information identifying the shipping container to the second system. Such information may, for example, comprise location information, bar code information, RFID information, size information, video or still image information, sensed temperature information, information describing the failed attempts at communicating with the shipping container (or sensor thereof), etc.

In an example scenario (e.g., a container-monitoring scenario) in which the Mobile AP collects shipping container sensor data from a shipping container, where the data is normal and no potential emergency condition or other anomaly is detected, the Mobile AP may determine to refrain from communicating information related to the collected sensor data or to communicate such information in a delay-tolerant manner (e.g., as an inexpensive or free communication link opportunistically becomes available, at the end of a route or shift, as a low-priority communication through a vehicle communication network, etc.). If, however, the Mobile AP (e.g., by analyzing the collected data) determines that the data is different from that expected (e.g., has one or more values outside of expected range(s), etc.), then the Mobile AP may determine to communicate information related to the collected data (e.g., raw data, processed data, metrics calculated from the collected data, etc.) to the second system.

As discussed herein, the Mobile AP may also establish communication links with and/or collect data from any of a variety of sensors along the travel route of the Mobile AP, in or on a vehicle carrying the Mobile AP, etc. (e.g., temperature sensors, traffic sensors, road condition sensors, weather sensors, video and/or audio sensors, gas particular sensors, any of the sensors discussed herein, etc.). The collected data may, for example, be associated with shipping, but may also be entirely unrelated to shipping or shipping containers. The Mobile AP may communicate such collected data to the second system or other systems (e.g., in a relatively low-priority or delay-tolerant manner). In an example scenario, the Mobile AP may communicate such sensor information (e.g., unrelated to shipping) in a manner that is different from sensor information that is directly related to shipping. In such a manner, a Mobile AP of a vehicle that is unrelated to shipping may utilize leftover processing and/or communication capability to collect, communicate, and/or analyze sensor data related to shipping, and a Mobile AP of a vehicle that is related to shipping may utilize leftover processing and/or communication capability to collect, communicate, and/or analyze sensor data that is unrelated to shipping.

In an example scenario in which the Mobile AP has been downloaded with (or is operating in accordance with) a shipping container movement plan, for example a plan that the vehicle carrying the Mobile AP is to follow for a work shift, the Mobile AP may receive an initial shipping container movement plan from a Central Shipping Controller or other node. The Mobile AP (or vehicle carrying the Mobile AP, or person(s) operating the vehicle) may then operate in accordance with the plan. The Mobile AP may, for example, receive such a shipping container movement plan at the beginning of a shift, during a shift, etc. The shipping container movement plan may be static, but may also be dynamically adaptable, for example based at least in part on sensor data collected by the Mobile AP, based on an updated plan received from a Central Shipping Controller or another Mobile AP, etc. For example, in an example scenario in which the Mobile AP collects sensor data from a shipping container that was identified as lost, the Mobile AP may adjust its shipping container movement plan to include moving the found shipping container to an appropriate destination. As another example, the Mobile AP may collect temperature data from a shipping container that indicates a failure in a cooling system for perishable items. The Mobile AP may adjust its shipping container movement plan to include moving the failing shipping container to a maintenance location. The Mobile AP may, for example, modify the shipping container movement plan autonomously or in conjunction with a shipping controller. Note that a shipping container movement plan may, for example, be based on previously-collected shipping container sensor information (e.g., from a previous shift, from a previous day, from an immediately prior Mobile AP, etc.).

In an example scenario in which the Mobile AP has been downloaded with (or is operating in accordance with) a data collection plan, for example a sensor data collection plan that the vehicle carrying the Mobile AP is to follow for a work shift, the Mobile AP may receive an initial data collection plan from a Central Shipping Controller or other node. The Mobile AP (or vehicle carrying the Mobile AP, or person(s) operating the vehicle) may then operate in accordance with the plan. The Mobile AP may, for example, receive such a data collection plan at the beginning of a shift, during a shift, etc. The shipping container movement plan may be static, but may also be dynamically adaptable, for example based at least in part on sensor data collected by the Mobile AP, based on an updated plan received from a Central Shipping Controller (e.g., a port controller, a distribution center controller, etc.) or another Mobile AP, etc. For example, in an example scenario in which the Mobile AP collects sensor data from a shipping container and where the collected sensor data indicates that the shipping container may be having internal environmental issues (e.g., temperature control issues, etc.), the Mobile AP may determine to collect additionally (but previously unplanned) information from the shipping container (e.g., power supply information, HVAC system diagnostic information, etc.). As another example, the Mobile AP may collect identity and location information from a shipping container that indicates the shipping container is not where the system believed it to be. In response, the Mobile AP may (e.g., autonomously, under the direction of a Central Shipping Controller, etc.) determine to collect additional information from the shipping container (e.g., travel history information, security information, etc.) and/or collect information from adjacent shipping containers. Note that a shipping container sensor data collection plan may, for example, be based on previously-collected shipping container sensor information (e.g., from a previous shift, from a previous day, from an immediately prior Mobile AP, etc.).

In another example scenario, a smart shipping container may be capable of receiving control information from the Mobile AP (or other nodes). For example, the Mobile AP may analyze temperature information received from a smart shipping container, and direct the shipping container to adjust its temperature. Also for example, the Mobile AP may analyze power supply information from a smart shipping container, and direct the shipping container to enter a low-power or sleep mode to conserve energy (e.g., based on comparison between the collected power supply information and a threshold value, etc.). The Mobile AP may then, for example, report the low-power or sleep mode status of the shipping container to a Central Shipping Controller, other nodes, other Mobile APs, other containers, etc.

Figure 10:
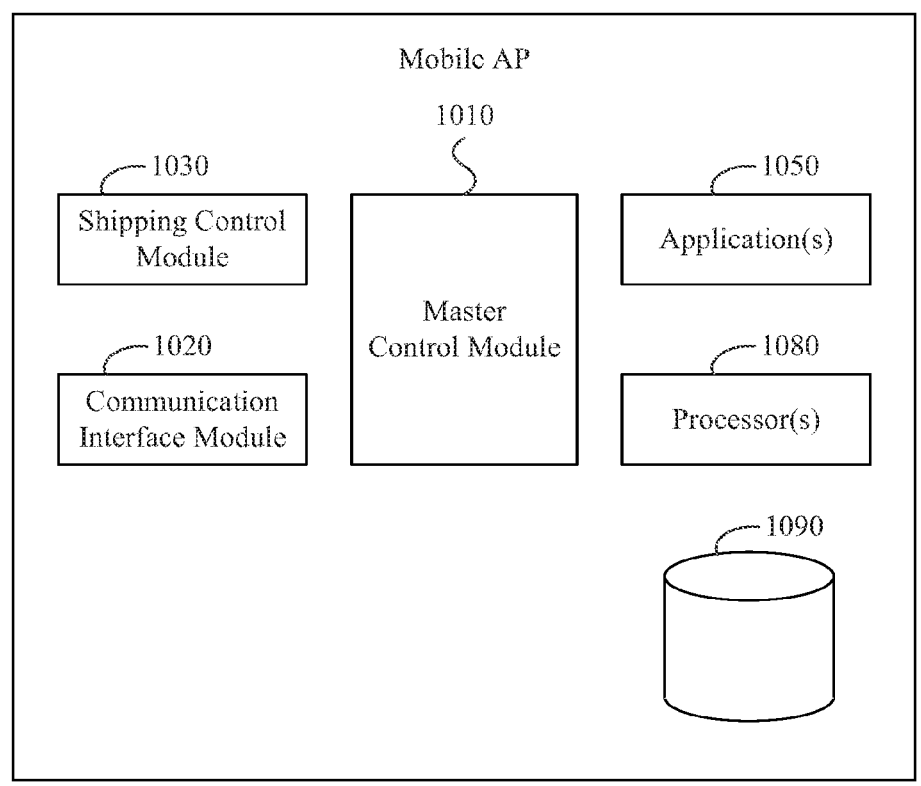
FIG. 10 shows a block diagram of an example mobile access point, in accordance with various aspects of the present disclosure.

FIG. 10 shows a block diagram of an example mobile access point, in accordance with various aspects of the present disclosure. The example Mobile AP 1000 may, for example, share any or all characteristics with the other example methods, nodes, networks, and/or network components 100-900, 1100 and 1200, discussed herein. For example, any or all of the components of the example Mobile AP 1000 may perform any or all of the method steps presented herein, for example with regard to a Mobile AP. Note that the Mobile AP 1000 may also be referred to herein as an OBU.

The example Mobile AP 1000 may, for example, comprise a Communication Interface Module 1020 that operates to perform any or all of the wireless and/or wired communication functionality for the Mobile AP 1000, many examples of which are provided herein (e.g., communication with Central Shipping Controllers (or NOCs), communication with Cloud databases, communication with smart shipping containers and/or sensors, communication with local shipping control systems of vehicles or Mobile APs, communication with NCs, communication with Fixed AP nodes, communication with Mobile AP nodes, communication directly with client devices, backhaul or cellular communication, etc.). The Communication I/F Module 1020 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), etc. For example, any of the example communication discussed herein between a Mobile AP and a shipping container, between a Mobile AP and an NC, between a Mobile AP and a Fixed or Mobile AP, between a Mobile AP and a local shipping control system (or module), between a Mobile AP and a Cloud database, between a Mobile AP and a Central Shipping Controller, etc., may be performed utilizing the Communication Interface Module 1020.

The example Mobile AP 1000 also comprises a Shipping Control Module 1030 that, for example, operates to perform any or all of the shipping control functionality (e.g., including sensor data collection, analysis, communication, etc.; the communication of control information; etc.) discussed herein (e.g., with regard to the example method 900 of FIG. 9, with regard to the shipping control functionality discussed herein with regard to FIGS. 7-8 and FIGS. 11-12, etc.). The Shipping Control Module 1030 may, for example, utilize communication services provided by the Communication Interface Module 1020 to perform various aspects of communication.

The example Mobile AP 1000 may, for example, comprise a Master Control Module 1010 that generally manages operation of the Mobile AP 1000 at a high level. Such Master Control Module 1010 may, for example, comprise various aspects of an operating system for the Mobile AP 1000.

The example Mobile AP 1000 may further, for example, comprise one or more Applications 1050 executing on the Mobile AP 1000 (e.g., shipping control applications, sensor interface applications, client management applications, security applications, power management applications, vehicle monitoring applications, location services applications, user interface applications, etc.).

The example Mobile AP 1000 may also comprise one or more Processors 1080 and Memory Devices 1090. The Processor(s) 1080 may, for example, comprise any of a variety of processor characteristics. For example, the Processor(s) 1180 may comprise one or more of a general purpose processor, RIS processor, microcontroller, ASIC, DSP, video processor, co-processor, etc. The Memory Device(s) 1090 may, for example comprise any of a variety of memory characteristics. For example, the Memory Device(s) 1090 may comprise a volatile memory, non-volatile memory, etc. The Memory Device(s) 1090 may, for example, comprise a non-transitory computer-readable medium that comprises software instructions that when executed by the Processor(s) 1080, cause the Mobile AP 1000 to perform any or all of the functionality discussed herein (e.g., shipping control functionality, sensor interface functionality, mobility management functionality, communication functionality, etc.).

Note that the example Mobile AP 1000 may also be a Fixed AP 1000 (or base station), in which case, the modules operate to perform any or all of the functionality discussed herein with regard to Fixed APs and/or base stations. Also note that the example Mobile AP 1000 may be implemented in any of the communication network nodes discussed herein (e.g., Cloud nodes, backbone network nodes, vehicle network nodes, client or user devices, etc.).

Various aspects of the present disclosure generally concern operation of one or more nodes of a communication network (e.g., a Central Shipping Controller, a Cloud server, a Cloud database, a Network Operations Center, etc.). Various examples of such operation will now be presented in the context of an example method that may be implemented in a Central Shipping Controller (e.g., a port controller, a distribution center controller, a train controller, a trucking controller, etc.), for example implemented in a Cloud-based server or computing system, but the scope of this disclosure is not limited thereto. For example, any or all of the aspects may be performed in any of the communication network nodes discussed herein, autonomously or in a distributed manner among a plurality of such nodes (e.g., in one or more Network Controller nodes, in one or more Fixed APs, in one or more Mobile APs, in one or more client or user devices, any combination of such nodes, etc.).

Figure 11:
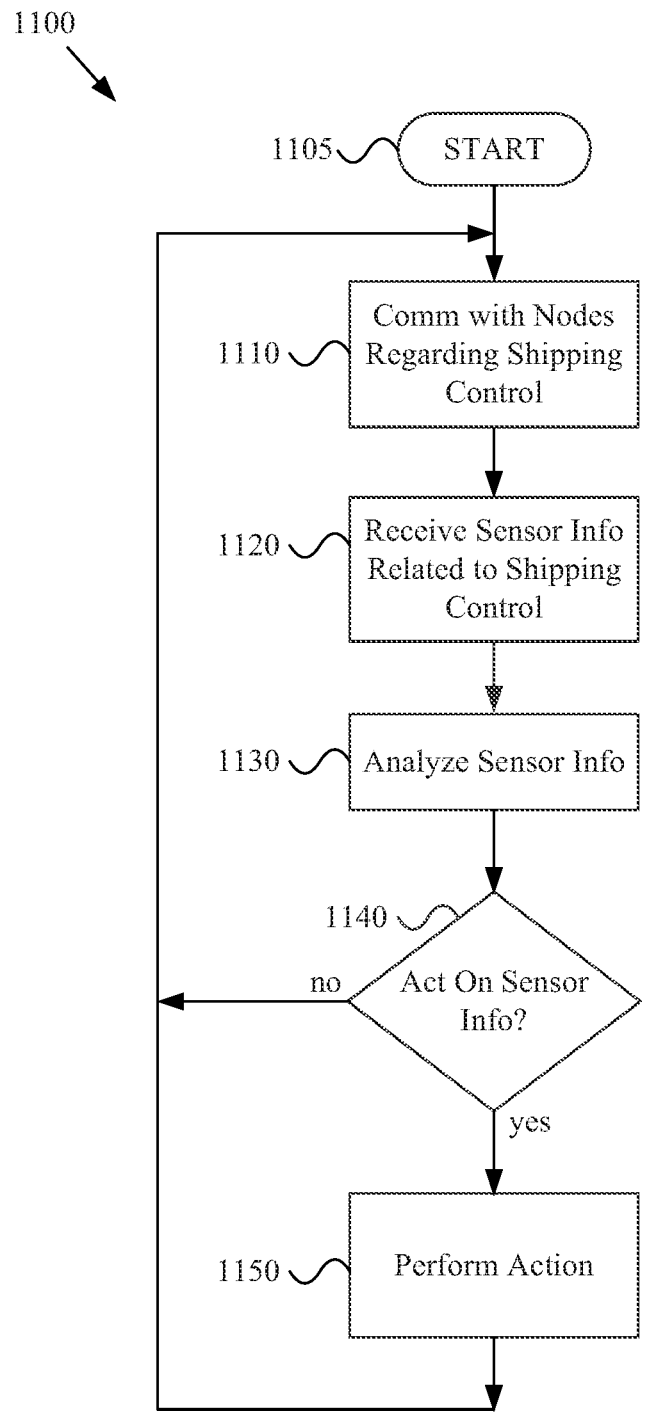
FIG. 11 shows a flow diagram of an example method of controlling shipping, in accordance with various aspects of the present disclosure.

FIG. 11 shows a flow diagram of an example method of controlling shipping (e.g., managing shipping containers, etc.), in accordance with various aspects of the present disclosure. The example method 1100 may, for example, share any or all characteristics with the other example methods, nodes, networks, and/or network components 100, 200, 300, 400, 500-570, 600, 700, 800, 900, 1000, and 1200, shown and/or discussed herein. The example method 1100, or any portion thereof, may for example be implemented in a Central Shipping Controller (e.g., a port controller, a train controller, a trucking controller, a central distribution system controller, etc.). Also for example, the example method 1100 or any portion thereof may, for example, be implemented in a network database, a networked server, a Network Controller, a Fixed AP, a Mobile AP, any node discussed herein, etc. Note that although various examples provided herein are presented in the context of a central controller (e.g., a server, computer system, etc.), the scope of this disclosure is not limited to a centralized implementation. For example, the various aspects may also be performed in a distributed system comprising a plurality of networked nodes (e.g., servers, computer systems, access points, network controllers, sensor systems, etc.).

The example method 1100 begins executing at block 1105. The example method 1100 may begin executing in response to any of a variety of causes or conditions, non-limiting examples of which are provided herein. For example, the example method 1100 may begin executing in response to a user command to begin, in response to a signal received from a network node (e.g., from a networked database, from a local shipping controller of a vehicle or MAP thereof, from a client dashboard or control panel, etc.), in response to a detected environmental or shipping condition (e.g., a shipping container condition, a road service condition, a weather condition, etc.), in response to a detected emergency condition, in response to a timer, in response to a power-up (or turn on or reset) event at a system implementing any or all aspects of the example method 1100, etc.

At block 1110, the example method 1100 comprises communicating with one or more communication network nodes (e.g., root nodes, leaf nodes, intermediate nodes, vehicle network nodes, Mobile APs, Fixed APs, Network Controllers, backbone communication network nodes, Cloud-based databases, sensors, etc.) regarding shipping control. As discussed herein (e.g., with regard to FIG. 9, FIGS. 7-8, FIGS. 1-6, etc.), such communication may comprise communicating information regarding shipping and/or shipping containers (e.g., receiving and/or transmitting information directing the collection of sensor data, directing shipping, directing shipping container movement, etc.). Many non-limiting examples of such information have been provided herein.

Such communication may comprise any of a variety of characteristics. For example, block 1110 may comprise a Central Shipping Controller (or other node) communicating information to a Mobile AP concerning how the Mobile AP is to conduct data collection activities (e.g., data collection control information). For example, such information may comprise information concerning sensors with which the Mobile AP is to communicate to obtain sensor information (e.g., sensor geographical location, sensor network address or other identification, sensor type, shipping container identity, etc.). Also for example, such information may comprise information identifying when the Mobile AP is to collect (or gather) data from various sensors. Additionally, for example, such information may comprise information regarding the manner in which the Mobile AP is to communicate collected data to the Central Shipping Controller (or database(s) accessed thereby). For example, such information may indicate whether data collected from a sensor is to be communicated immediately (e.g., via a cellular network, via the vehicle network, etc.), whether the data is to be communicated within a particular amount of time (e.g., within a number of seconds, within a number of minutes, etc.), whether the data has a higher priority than other data, etc.

The information communicated by the Central Shipping Controller (or other node) may also, for example, comprise shipping command information. A Central Shipping Controller may, for example, communicate control commands to local shipping vehicles (or Mobile APs thereof), for example to a vehicle that loads/unloads shipping containers, a vehicle that transports shipping containers, etc. Such commands may, for example, be originated by the Central Shipping Controller and communicated through one or more Mobile APs and/or Fixed APs. In an example scenario, a Central Shipping Controller may communicate a "container load" or "pick-up" command through a Mobile AP that is within communication range of a vehicle (or Mobile AP thereof) capable of implementing the "container load" or "pick-up" command. In another example scenario, the Central Shipping Controller may communicate a "no collect" or "no pick-up" command for a particular vehicle to the vehicle communication network, which then has the responsibility to propagate the command to the particular vehicle through one or access points (e.g., FAPs, MAPs, etc.) that are geographically close to the particular vehicle.

In general, block 1110 may comprise communicating with one or more communication network nodes regarding shipping or related services. Accordingly, the scope of this disclosure should not be limited by characteristics of any particular shipping service being provided and/or related conditions, any particular type of shipping-related information, or any particular manner of performing such communicating.

The example method 1100 may, at block 1120, comprise receiving (e.g., at a Central Shipping Controller or other node), sensor information related to shipping services (e.g., container movement, etc.) being performed. For example, block 1120 may comprise receiving such sensor information from a Mobile AP (or other node) collecting sensor data as the Mobile AP (or vehicle carrying the Mobile AP) travels along a route. Note that the route may be predefined (e.g., a container pick-up and/or delivery plan, a bus route, mail collection route, etc.), partially defined (e.g., a security service patrol beat, etc.), generally random, etc. In an example scenario, the Central Shipping Controller (or other node) may have provided information regarding the route (e.g., a container movement plan, a container inventory route, a bus route, a road maintenance plan, etc.) and/or sensors along the route to the Mobile AP (or vehicle or operator thereof) at block 1110.

For example, as a Mobile AP (or other node) travels along a route, the Mobile AP may operate to collect sensor data from sensors (e.g., shipping container sensors or sensor systems) along the route. Some or all of the sensors may, for example, have been identified by the Central Shipping Controller at block 1110. In an example scenario, at block 1110 the Central Shipping Controller may have communicated to the Mobile AP a list of secure sensors from which the Mobile AP is to collect data, where the list includes geographical locations of the sensors, security codes for the sensors, operation characteristics (e.g., sleep mode characteristics, communication protocol characteristics, etc.) for the sensors, instructions for how to handle data gathered from the sensors, etc. As a Mobile AP gathers data from one or more sensors, the Central Shipping Controller (or other node) may receive the sensor data (or information related to the sensor data, for example raw sensor data, summarized sensor data, calculated metrics, etc.) at block 1120. Note that, as discussed herein, the communication of information may be performed immediately in real-time, in a delay tolerant manner, via one or more databases, etc.

At block 1130, the example method 1100 may comprise analyzing the received sensor information, for example to determine whether to perform one or more actions related to the received information. Such actions may comprise any of a variety of characteristics.

For example, block 1130 may comprise analyzing the received information to determine whether a shipping service plan (e.g., a shipping container movement plan, a shipping container inventory plan, a shipping container sensor data collection plan, etc.) of a vehicle carrying the Mobile AP (or other vehicle) should be immediately modified. In an example scenario, the Mobile AP may be carried by a vehicle that is providing a shipping-related service. For example, the Mobile AP may be carried by a vehicle engaged in shipping container movement, loading/unloading, transportation, inventory, security, etc., and the collected sensor data may be from shipping container sensors and/or other sensors related to shipping. The Central Shipping Controller, having received the sensor data (or information related to the sensor data) from the Mobile AP, may analyze such data (or information) to determine whether the present shipping service plan guiding operation of the vehicle (and crew thereof) should be modified. For example, as discussed herein, an unexpected situation (e.g., a located lost container, a container with a failing environmental control system, a chemical spill, etc.) may arise while the vehicle is performing its shipping-related duty according to a predefined shipping service plan (e.g., which may have communicated at block 1110). In response to information related to sensor data indicating that a shipping container is urgently in need of servicing, the Central Shipping Controller may determine that the shipping service providing plan should immediately be altered. Such a decision may, for example, be based at least in part on the sensor data level (e.g., relative to one or more thresholds, analyzed in light of statistical expectations (e.g., averages, standard deviations or variances, etc.), time-of-day, day-of-week, geographical location, the location of the shipping container relative to the vehicle and/or the vehicle's planned route, etc.). Similarly, the Central Shipping Controller may determine that a shipping service providing plan of a vehicle different from the vehicle carrying the Mobile AP should be modified. For example, as explained herein, a vehicle independent of (e.g., entirely unrelated to, etc.) the shipping service being provided may provide the sensor information being analyzed by the Central Shipping Controller to control the providing of the service.

Block 1130 may also, for example, comprise analyzing the received sensor information and determining that the received sensor information will be considered when the next shipping service providing plan is developed (e.g., for a next day, next shift, next route, etc.), for example rather than immediately modifying a shipping service providing plan for a vehicle that is currently in the field.

Block 1130 may additionally, for example, comprise analyzing the received sensor information and determining that the sensor originating the received sensor information (or related sensor data) should be monitored more frequently. In such an example scenario, block 1130 may comprise communicating a command to one or more other nodes (e.g., Mobile APs, etc.) to communicate with the sensor whenever the opportunity arises (e.g., when Mobile APs are passing by and within range of the sensor, etc.).

Other example actions that may be taken by the Central Shipping Controller (or other node) may, for example, comprise alerting a client system associated with the particular shipping service of a detected condition and/or of a modification to a shipping service plan, alerting a user (e.g., a driver or controller of a vehicle, a dispatcher, etc.) of a detected shipping container condition, communicating to the sensor (and/or a customer associated with the sensor) that the sensor data has been received and/or successfully reported, communicating to a customer associated with the sensor an estimate of when a service call related to the sensor may be performed (e.g., a scheduled time of shipping container pick-up, etc.), etc.

In general, block 1130 may comprise analyzing the received sensor information, for example to determine whether to perform one or more actions related to the received information. Accordingly, the scope of the present disclosure should not be limited by characteristics of any particular action, manner of determining whether to perform an action, etc.

The example method 1100 may, at block 1140, comprise directing execution flow of the example method 1100. If it is determined at block 1130 that no action is to be taken based on the analysis formed at block 1130, then block 1140 directs execution flow of the example method 1100 back up to block 1110 (or any block of the example method 1100 or any step of any method discussed herein). If it is determined at block 1130 that one or more actions are to be taken based on the analysis formed at block 1130, then block 1140 directs execution flow of the example method 1100 to block 1150 for performance of the action(s). After block 1150, execution of the example method 1100 flows back up to block 1110 (or any block of the example method 1100 or any step of any method discussed herein).

Figure 12:
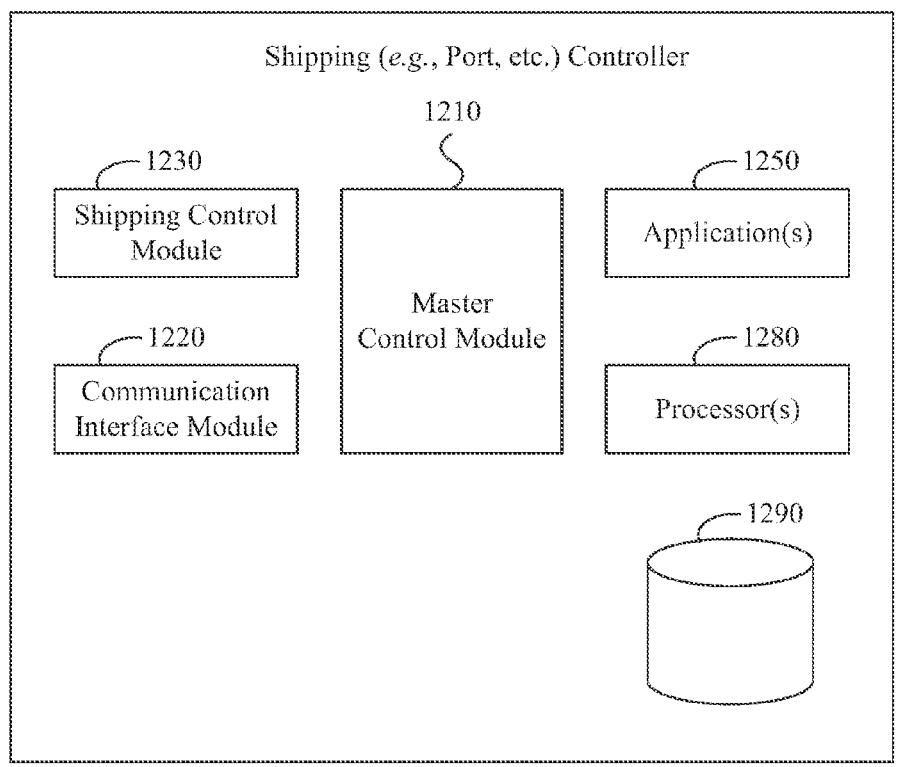
FIG. 12 shows a block diagram of an example shipping controller, in accordance with various aspects of the present disclosure.

FIG. 12 shows a block diagram of various components of an example Central Shipping Controller (CSC), in accordance with various aspects of the present disclosure. The example CSC 1200 may, for example, share any or all characteristics with the other example methods, nodes, networks, and/or network components 100-1100, discussed herein. For example, any or all of the components of the example Central Shipping Controller 1200 may perform any or all of the method steps presented herein. As discussed herein, although the CSC 1200 is presented here in the context of a central (e.g., cloud-based) controller (or server or NOC), it should be understood that any or all aspects of the example CSC 1200 may be implemented in any (or any combination) of the nodes discussed herein. For example, in an example implementation, the CSC 1200 may be implemented in a distributed manner among the Mobile APs and/or Fixed APs of the vehicle network.

The example CSC 1200 may, for example, comprise a Communication Interface Module 1220 that operates to perform any or all of the wireless and/or wired communication functionality for the CSC 1200, many examples of which are provided herein (e.g., communication with databases, communication with shipping control systems, communication with fleet controllers, communication with Fixed AP nodes, communication with Mobile AP nodes, communication with cellular (or other) base stations, landline communication, communication with the Cloud APIs or other entities, backhaul communication, communication with client dashboards or controllers, communication with shipping container sensors, communication with sensors in general, etc.). The Communication I/F Module 1220 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), POTS communication, etc. For example, any of the example communication discussed herein between a CSC and a Mobile AP, between a CSC and a Fixed AP, between a CSC and a backhaul network, between a CSC and a local service controller, etc., may be performed utilizing the Communication I/F Module 1220.

The example CSC 1200 also comprises a Shipping Control Module 1230 that, for example, performs any or all of the shipping control functionality discussed herein (e.g., with regard to the example method 1100 of FIG. 11, with regard to the shipping control functionality discussed with regard to FIGS. 7-10, etc.). The Shipping Control Module 1230 may, for example, utilize communication services provided by the Communication Interface Module 1220 to perform various aspects of communication.

The example CSC 1200 may, for example, comprise a Master Control Module 1210 that generally manages operation of the CSC 1200 at a high level. Such Master Control Module 1210 may, for example, comprise various aspects of an operating system for the CSC 1200.

The example CSC 1200 may further, for example, comprise one or more Applications 1250 executing on the CSC 1200 (e.g., shipping control applications, shipping container interface applications, sensor interface applications, road maintenance control applications, mass transit control applications, traffic control applications, client management applications, security applications, power management applications, vehicle monitoring applications, location services applications, user interface applications, etc.).

The example CSC 1200 may also comprise one or more Processors 1280 and Memory Devices 1290. The Processor(s) 1280 may, for example, comprise any of a variety of processor characteristics. For example, the Processor(s) 1280 may comprise one or more of a general purposes processor, RIS processor, microcontroller, ASIC, DSP, video processor, co-processor, etc.). The Memory Device(s) 1290 may, for example comprise any of a variety of memory characteristics. For example, the Memory Device(s) 1290 may comprise a volatile memory, non-volatile memory, etc. The Memory Device(s) 1290 may, for example, comprise a non-transitory computer-readable medium that comprises software instructions that when executed by the Processor(s) 1280, cause the CSC 1200 to perform any or all of the functionality discussed herein (e.g., shipping control functionality, shipping container interface functionality, shipping container sensor interface functionality, mobility management functionality, communication functionality, etc.).

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for shipping management in a network of moving things. As non-limiting examples, various aspects of this disclosure provide systems and methods for integrating sensors, mobile access points, and/or the network of moving things with shipping container management systems (e.g., port management systems, train management systems, trucking management systems, etc.). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A mobile access point (MAP) comprising:
at least one module comprising electronic circuitry and being operative to, at least:
establish communication links directly with other mobile access points;
establish communication links directly with sensors positioned along a travel route of the MAP, wherein the MAP is on-board a vehicle and the sensors positioned along the travel route of the MAP are not on-board the vehicle;
collect shipping container-related sensor data from the sensors; and
communicate information related to the collected shipping container-related sensor data to a second system.

2. The mobile access point of claim 1, wherein the vehicle is other than a vehicle that moves shipping containers.

3. The mobile access point of claim 2, wherein:
the vehicle comprises a public transportation vehicle; and
the at least one module is operative to provide Internet access to public passengers of the public transportation vehicle.

4. The mobile access point of claim 1, wherein the second system comprises a port controller.

5. The mobile access point of claim 1, wherein the second system comprises a second mobile access point (MAP), and wherein the second MAP is on-board a land vehicle and provides Internet access.

6. The mobile access point of claim 1, wherein the at least one module is operative to select at least one of a plurality of metropolitan area networks over which to communicate the information to the second system.

7. The mobile access point of claim 6, wherein the plurality of metropolitan area networks comprises:
a first metropolitan area network comprising a non-cellular vehicle communication network comprising a plurality of mobile access points and a plurality of fixed access points; and
a second metropolitan area network comprising a cellular communication network comprising a plurality of cellular base stations.

8. The mobile access point of claim 7, wherein the at least one module is operative to select at least one of a plurality of manners in which to communicate the information to the second system, the plurality of manners comprising:
a first manner comprising immediately communicating the information to the second system via the cellular communication network; and
a second manner comprising communicating the information to the second system in a delay tolerant manner via the non-cellular vehicle communication network.

9. The mobile access point of claim 6, wherein the at least one module is operative to select the at least one of the plurality of metropolitan area networks based, at least in part, on a value of the collected shipping container-related sensor data.

10. The mobile access point of claim 9, wherein the at least one module is operative to select the at least one of a plurality of metropolitan area networks based, at least in part, on whether the value is outside of a range of acceptable values.

11. The mobile access point of claim 6, wherein the at least one module is operative to select the at least one of the plurality of metropolitan area networks based, at least in part, on a list comprising shipping container identities.

12. The mobile access point of claim 6, wherein the at least one module is operative to select the at least one of the plurality of metropolitan area networks based, at least in part, on time-of-day and/or day-of-week.

13. The mobile access point of claim 6, wherein the at least one module is operative to:
determine a priority of the information; and
select the at least one of the plurality of metropolitan area networks based, at least in part, on the determined priority.

14. The mobile access point of claim 1, wherein the collected shipping container-related sensor data comprises temperature information.

15. The mobile access point of claim 1, wherein the collected shipping container-related sensor data comprises location information.

16. The mobile access point of claim 1, wherein the at least one module is operative to communicate information identifying a shipping container with which a communication link could not be established to the second system.

17. The mobile access point of claim 1, wherein the communicated information comprises information identifying a shipping container corresponding to collected shipping container-related sensor data having a value that is different from an expected value.

18. The mobile access point of claim 1, wherein the at least one module is operative to:
establish communication links with second sensors along the travel route of the MAP, wherein the second sensors are not on-board the vehicle;
collect second sensor data from the second sensors that is unrelated to shipping; and
communicate second information related to the collected second sensor data in a second manner different from a first manner in which the information related to the collected shipping container-related sensor data is communicated.

19. The mobile access point of claim 1, wherein the at least one module is operative to maintain a VoIP call with a personal communication device.

20. A mobile access point (MAP) comprising:
at least one module comprising electronic circuitry and being operative to, at least:
establish communication links directly with other mobile access points;
while the MAP is moving:
establish communication links directly with stationary sensors positioned along a travel route of the MAP; and
collect shipping container-related sensor data from the stationary sensors; and
analyze the collected shipping container-related sensor data to identify at least one action to perform.

21. The mobile access point of claim 20, wherein the at least one module is operative to analyze the collected shipping container-related sensor data to determine whether to communicate information related to the collected shipping container-related sensor data to a second system.

22. The mobile access point of claim 20, wherein the at least one module is operative to analyze at least the collected shipping container-related sensor data to select at least one of a plurality of independent communication networks over which to communicate information related to the collected shipping container-related sensor data to a second system.

23. The mobile access point of claim 20, wherein the at least one module is operative to analyze at least the collected shipping container-related sensor data to determine whether to modify a shipping container movement plan.

24. The mobile access point of claim 20, wherein the at least one module is operative to:
receive a shipping container movement plan prior to collecting the shipping container-related sensor data from the sensors; and
modify the shipping container movement plan in real-time based, at least in part, on the collected shipping container-related sensor data.

25. A mobile access point (MAP) comprising:
at least one module comprising electronic circuitry and being operative to, at least:
while a vehicle carrying the MAP is moving:
establish communication links directly with other mobile access points;
establish first communication links directly with first sensors positioned along a travel route of the MAP, where the first sensors are not on-board the vehicle;
collect first shipping container-related sensor data from the first sensors;
communicate the collected first shipping container-related sensor data to a second system via a first communication network;
establish second communication links directly with second sensors positioned on-board the vehicle;
collect second shipping container-related sensor data from the second sensors;
communicate the collected second shipping container-related sensor data to the second system via a second communication network independent of the first communication network;
receive data collection control information while the MAP is traveling on the travel route; and
adjust how the shipping container-related sensor data is being collected based, at least in part, on the received data collection control information.

26. The mobile access point of claim 25, wherein the at least one module is operable to receive the data collection control information directly from another mobile access point of a vehicle that is unrelated to transporting cargo and/or public passengers.

27. The mobile access point of claim 25, wherein the at least one module is operative to receive the data collection control information from a port controller.

28. The mobile access point of claim 25, wherein the at least one module is operative to adjust how the at least one module collects the shipping container-related sensor data, at least in part, on the collected shipping container-related sensor data.

* * * * *